Figure 15:
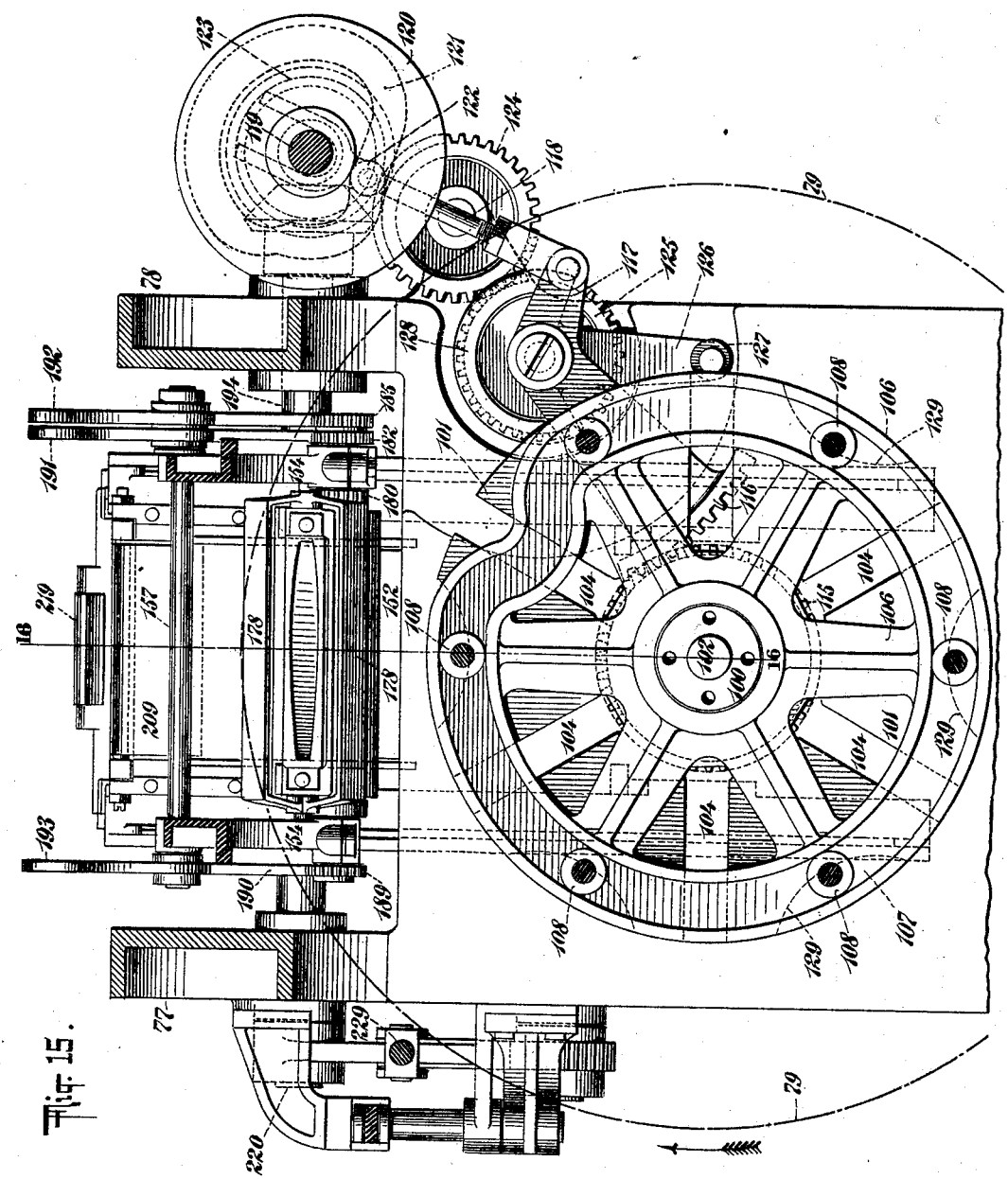

No. 707,748. Patented Aug. 26, 1902.
J. R. WILLIAMS.
CIGAR BUNCHING MACHINE.
(Application filed June 13, 1902.)
(No Model.) 20 Sheets—Sheet 1.
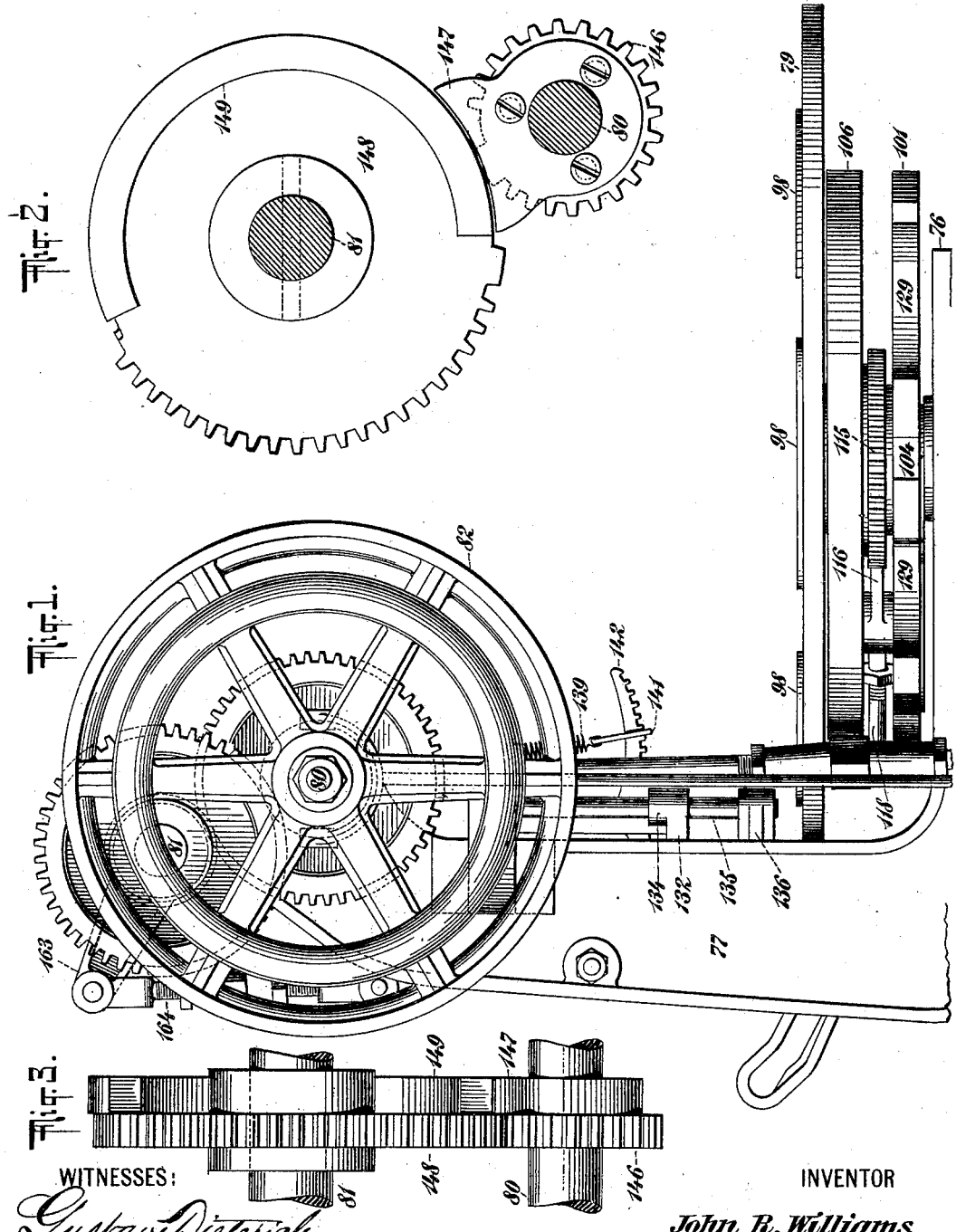
WITNESSES:
Gustav Dieterich
Edwin H. Dieterich
INVENTOR
John R. Williams
BY
Chas. O. Gill
ATTORNEY

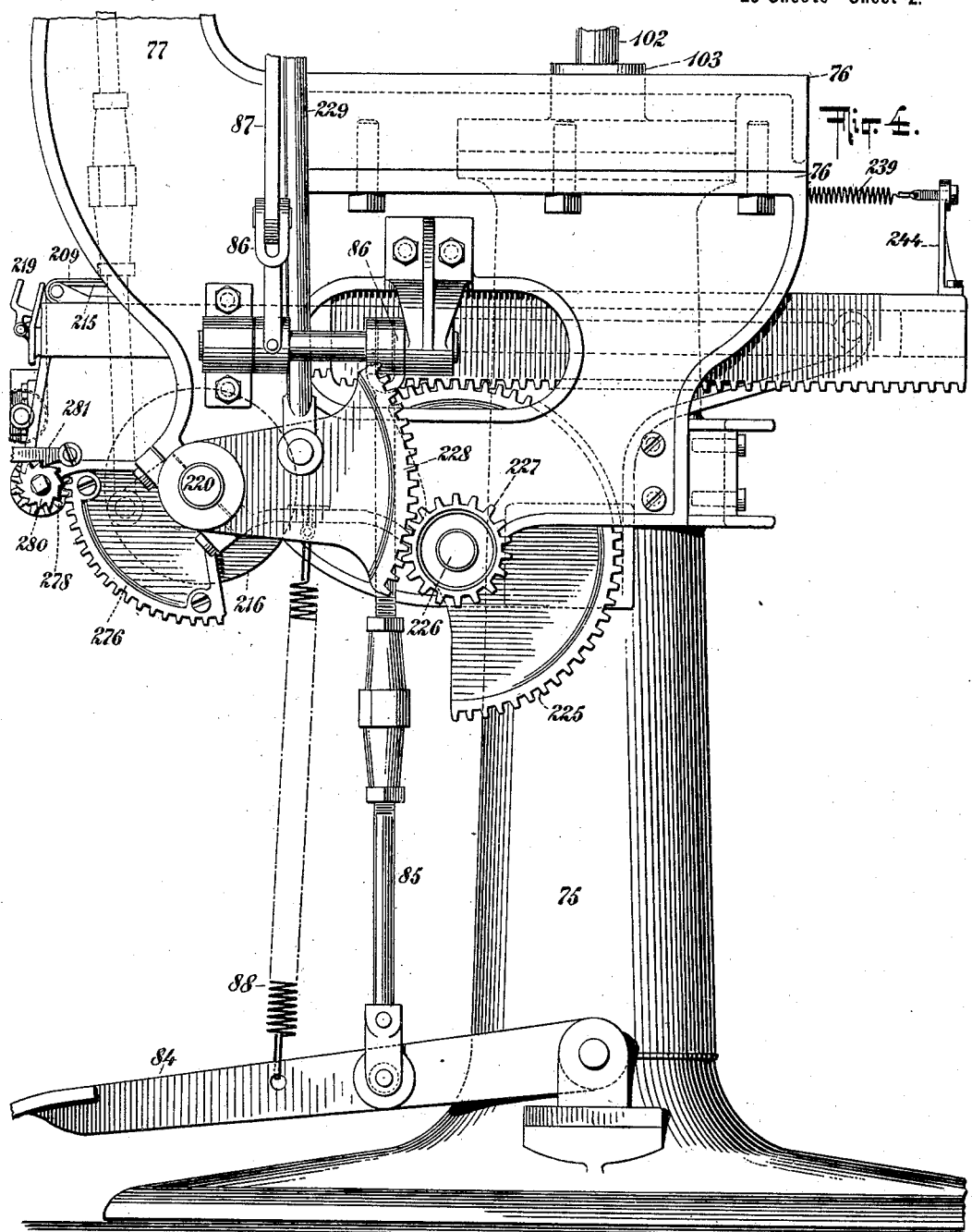

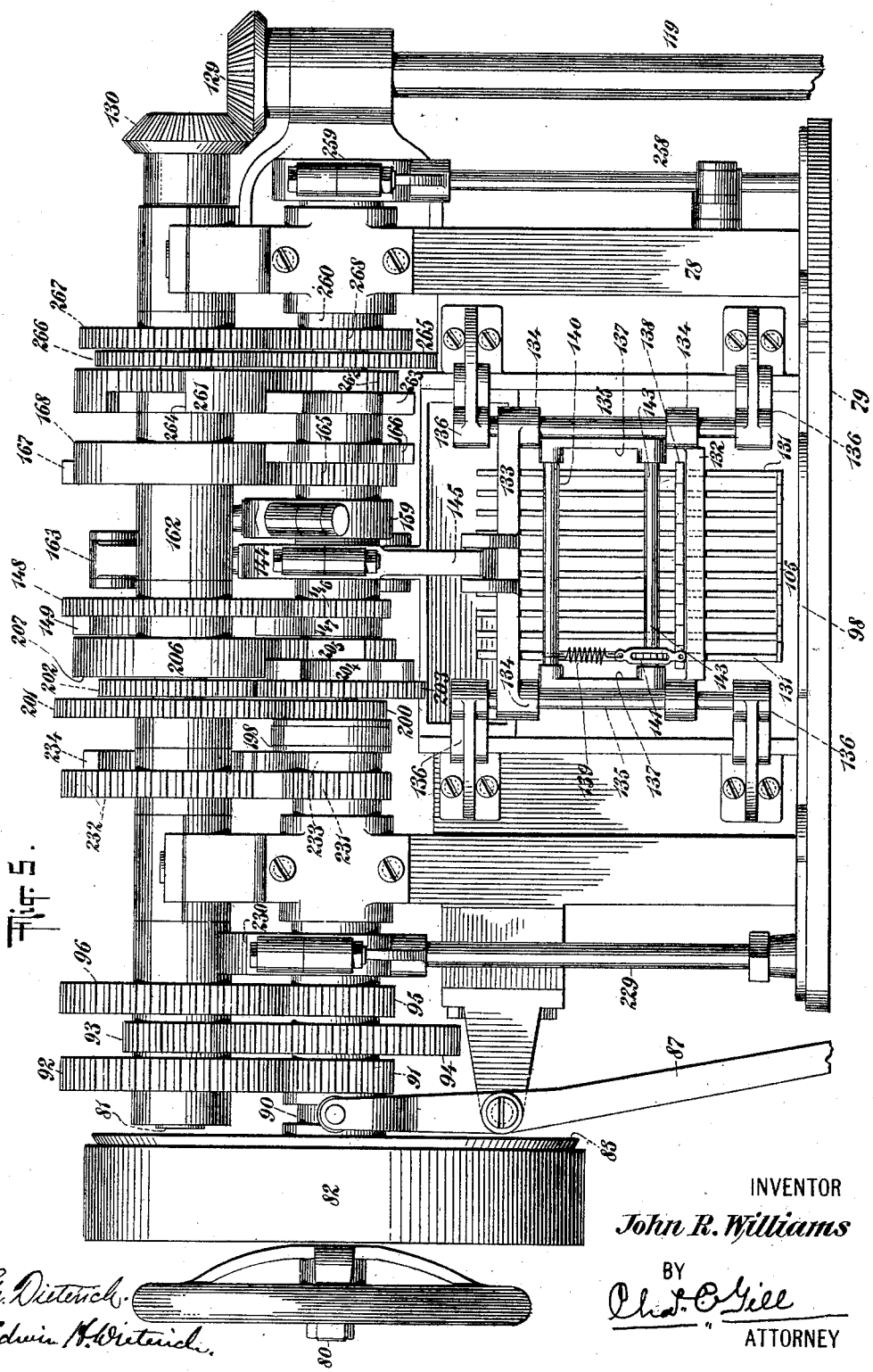

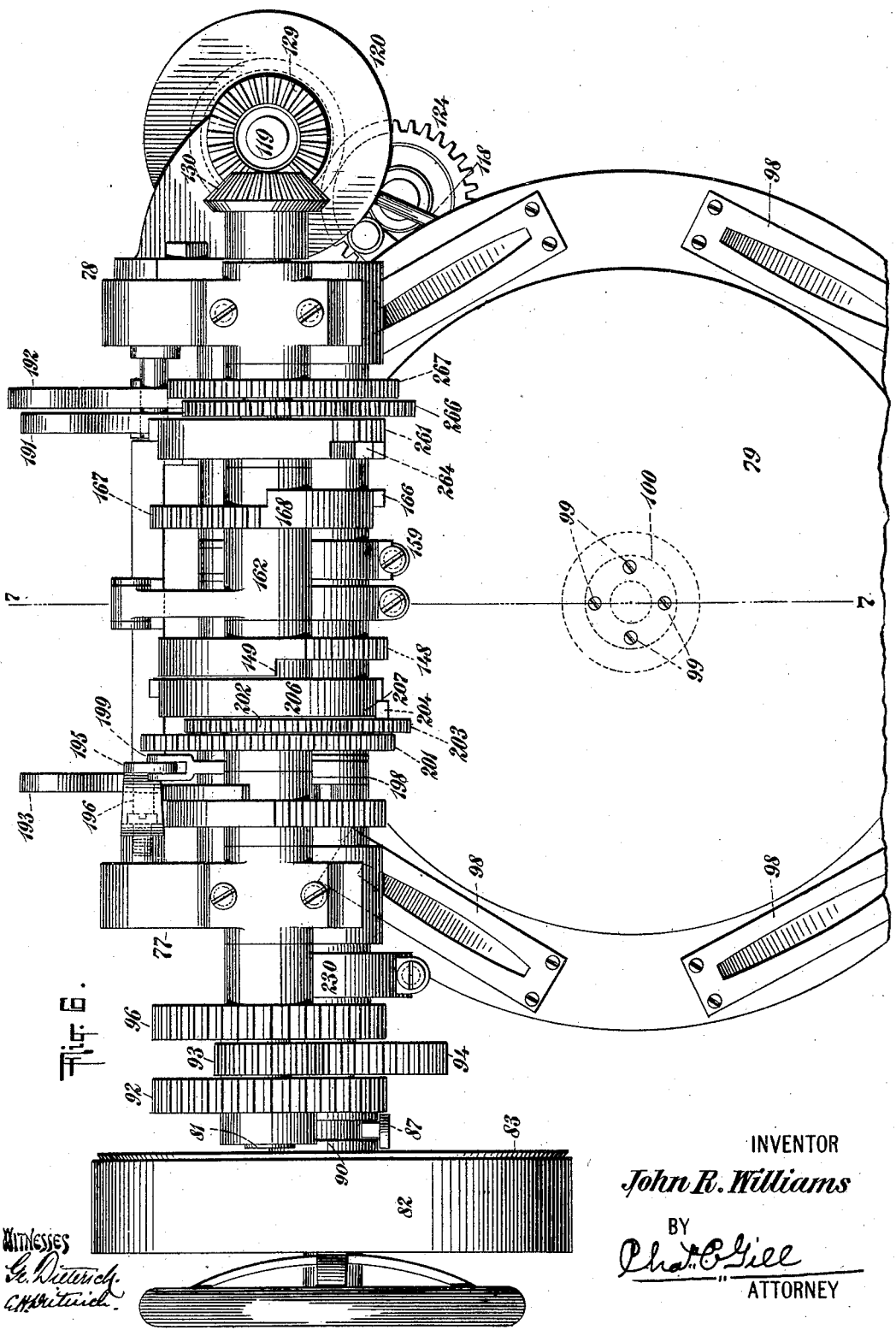

No. 707,748. Patented Aug. 26, 1902.
J. R. WILLIAMS.
CIGAR BUNCHING MACHINE.
(Application filed June 13, 1902.)
(No Model.) 20 Sheets—Sheet 5.
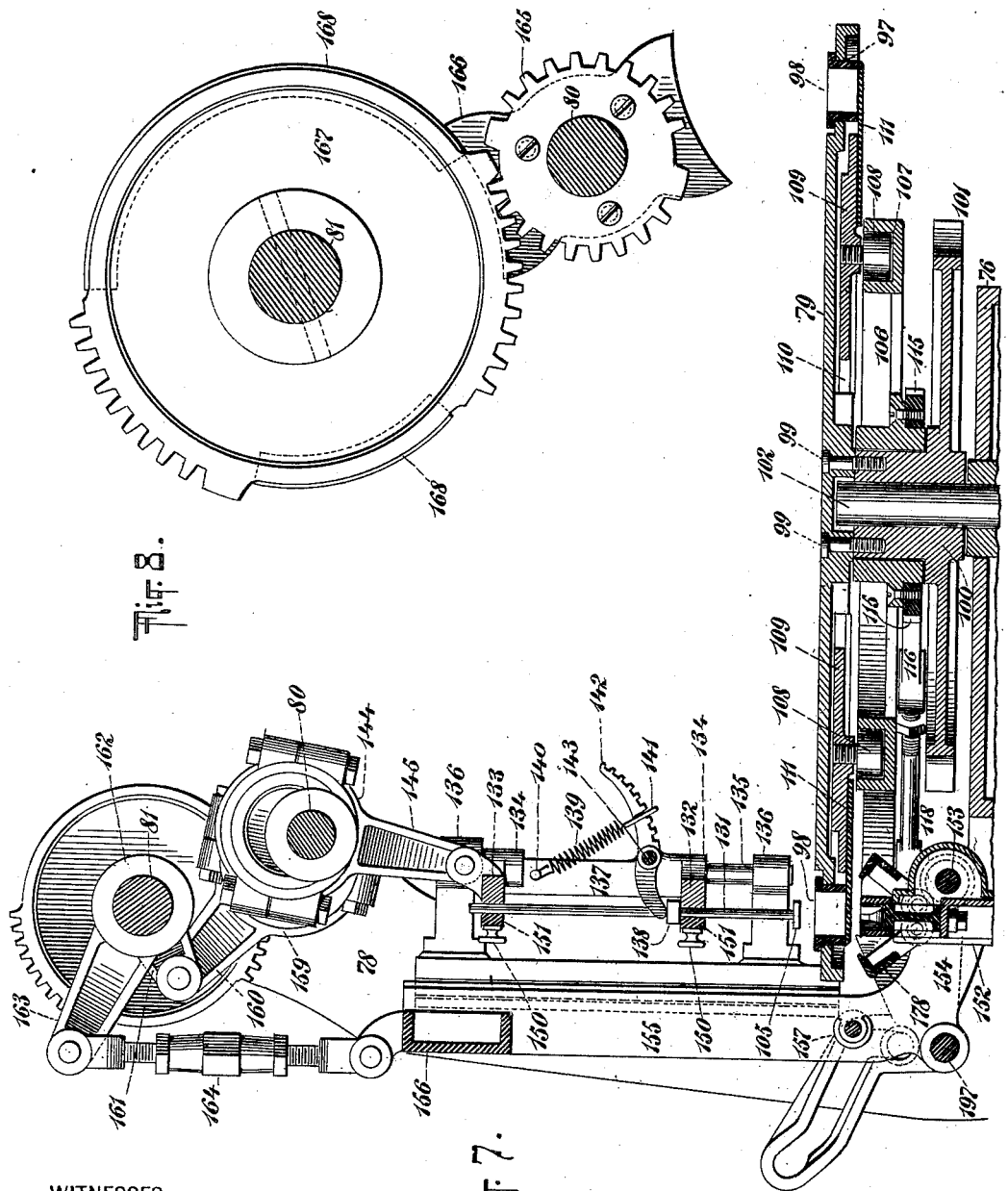
WITNESSES:
INVENTOR
John R. Williams
BY
ATTORNEY

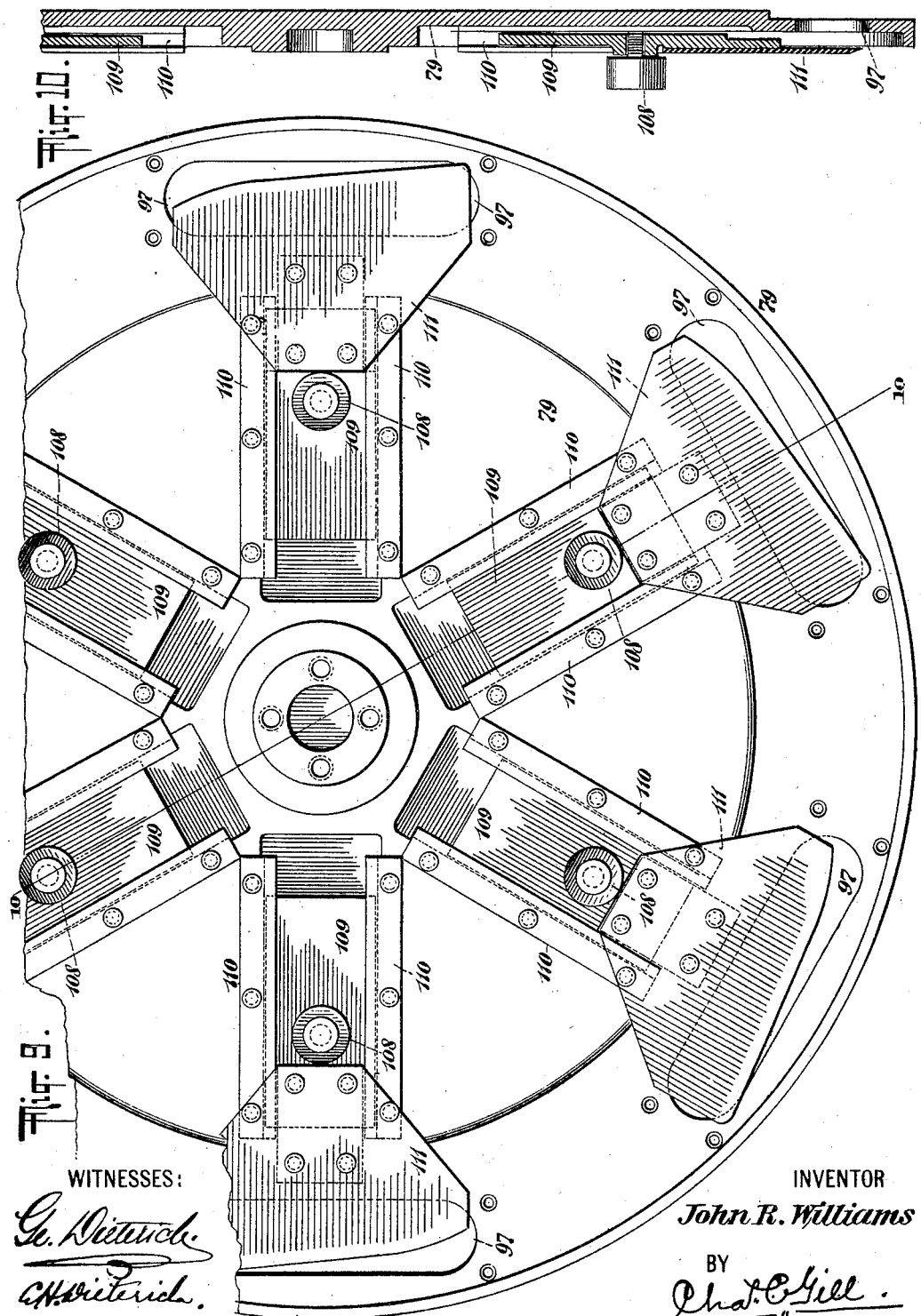

No. 707,748. Patented Aug. 26, 1902.
J. R. WILLIAMS.
CIGAR BUNCHING MACHINE.
(Application filed June 13, 1902.)
(No Model.) 20 Sheets—Sheet 7.
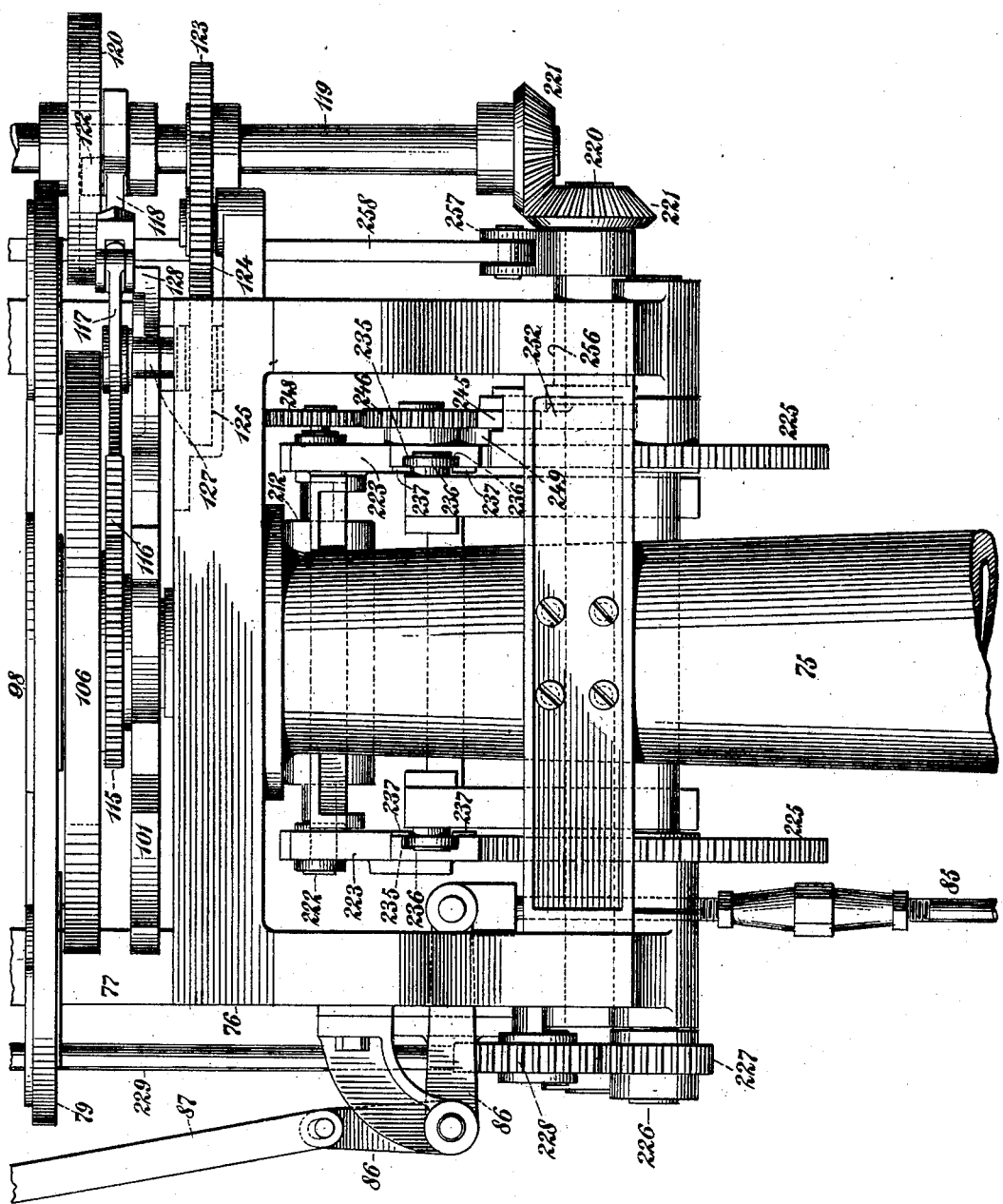
WITNESSES:
INVENTOR
John R. Williams
BY
ATTORNEY No. 707,748. Patented Aug. 26, 1902.
J. R. WILLIAMS.
CIGAR BUNCHING MACHINE.
(Application filed June 13, 1902.)
(No Model.) 20 Sheets—Sheet 8.
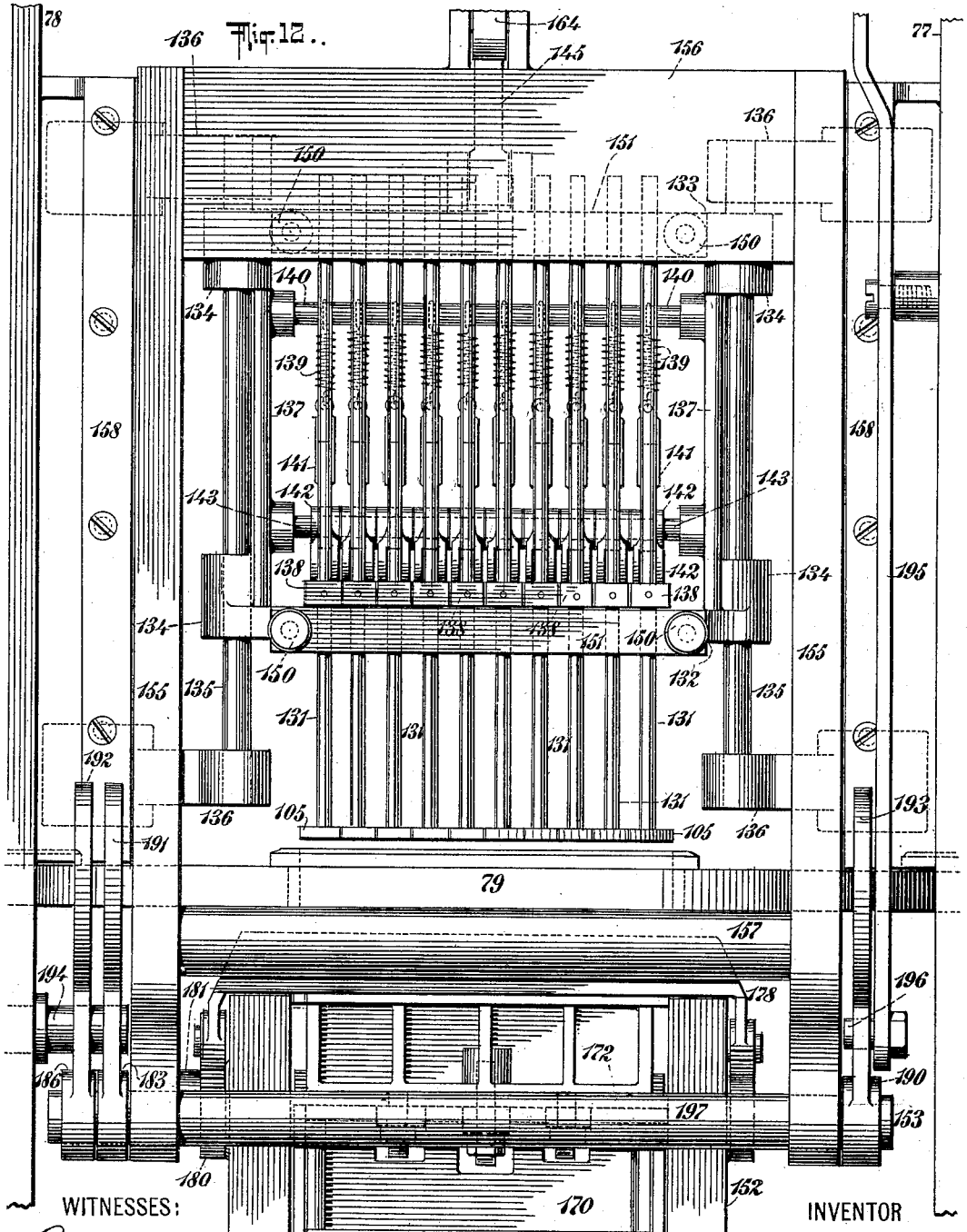
WITNESSES: INVENTOR
John R. Williams
BY
ATTORNEY No. 707,748. Patented Aug. 26, 1902.
J. R. WILLIAMS.
CIGAR BUNCHING MACHINE.
(Application filed June 13, 1902.)
(No Model.) 20 Sheets—Sheet 9.

WITNESSES: INVENTOR
John R. Williams
BY
ATTORNEY

No. 707,748. Patented Aug. 26, 1902.
J. R. WILLIAMS.
CIGAR BUNCHING MACHINE.
(Application filed June 13, 1902.)
(No Model.) 20 Sheets—Sheet 10.
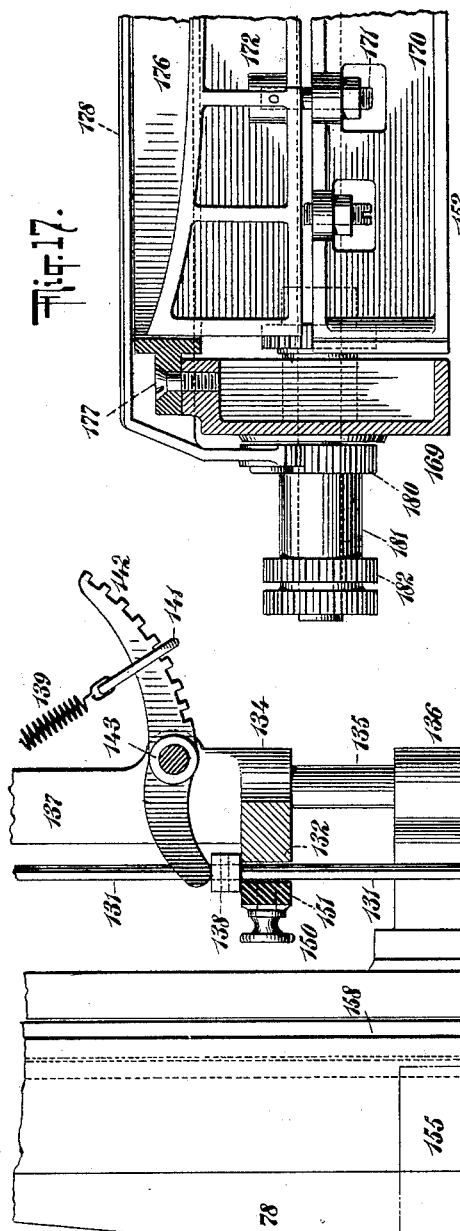
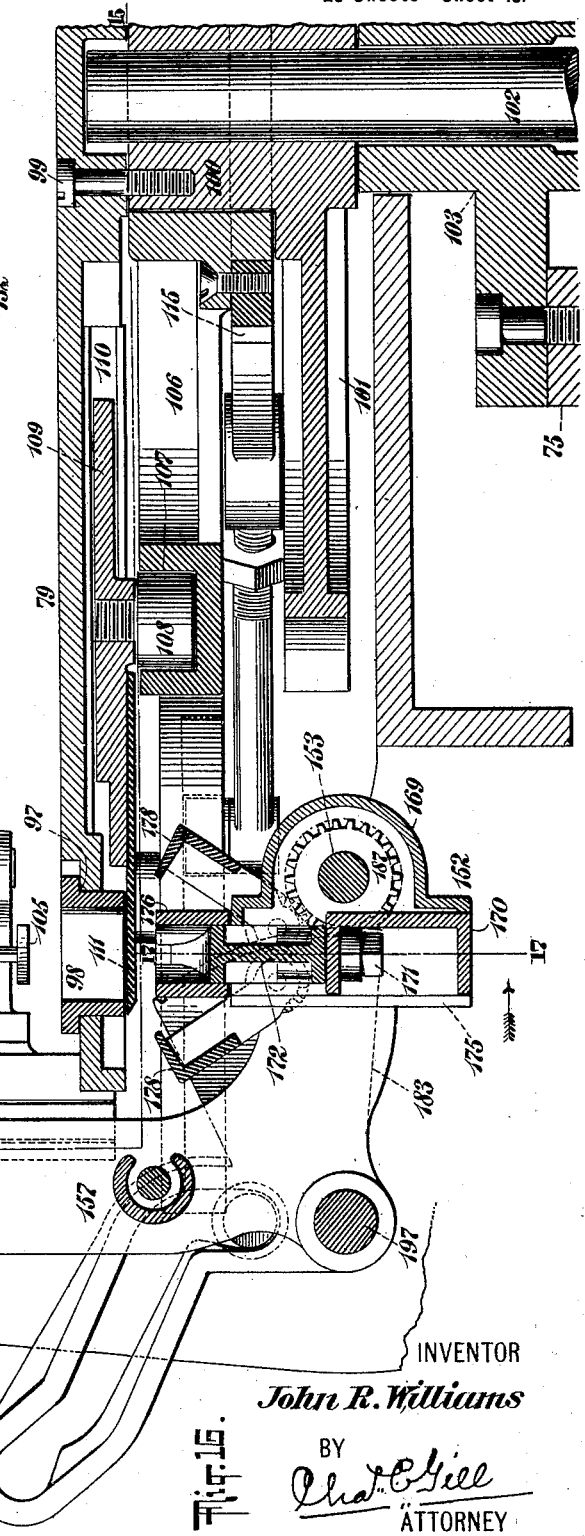
WITNESSES:
Gustave Dieterich.
Edwin H. Dieterich.
INVENTOR
John R. Williams
BY
Chas. C. Gill
ATTORNEY

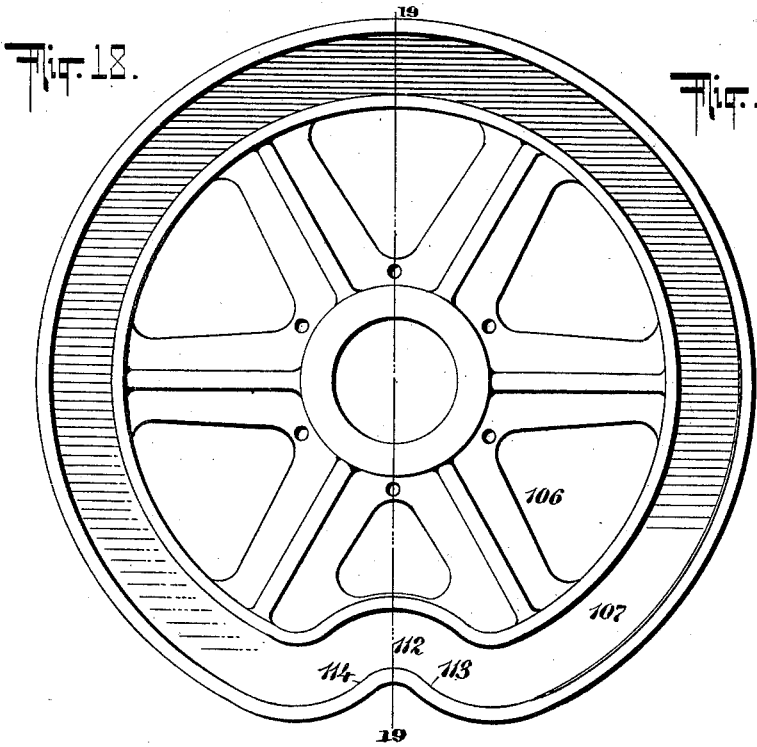
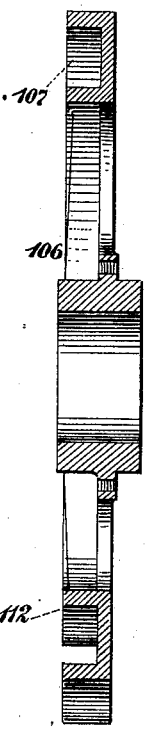
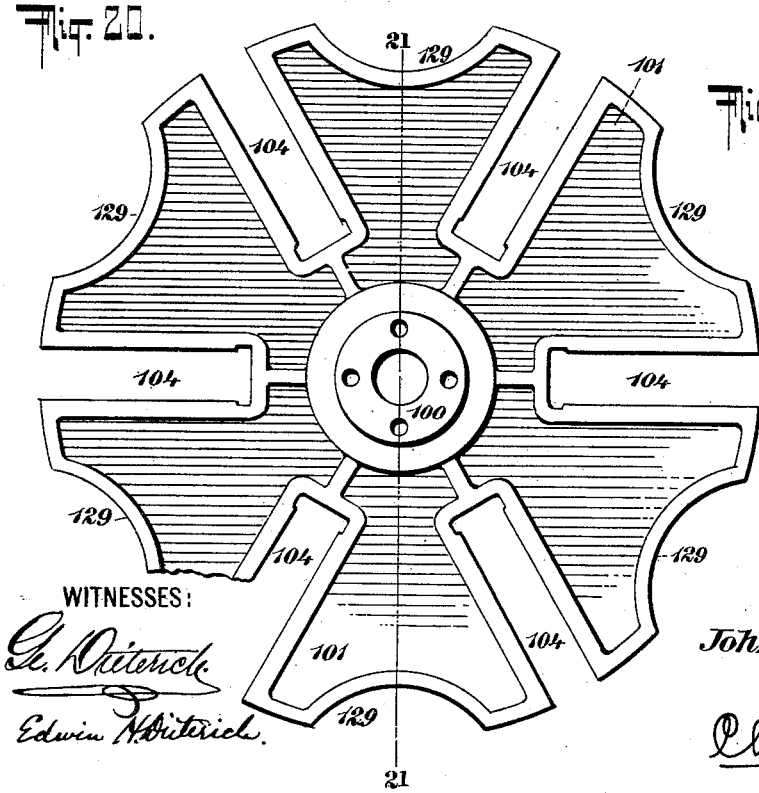
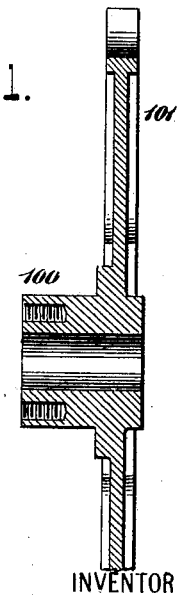

No. 707,748. Patented Aug. 26, 1902.
J. R. WILLIAMS.
CIGAR BUNCHING MACHINE.
(Application filed June 13, 1902.)
(No Model.) 20 Sheets—Sheet 12.
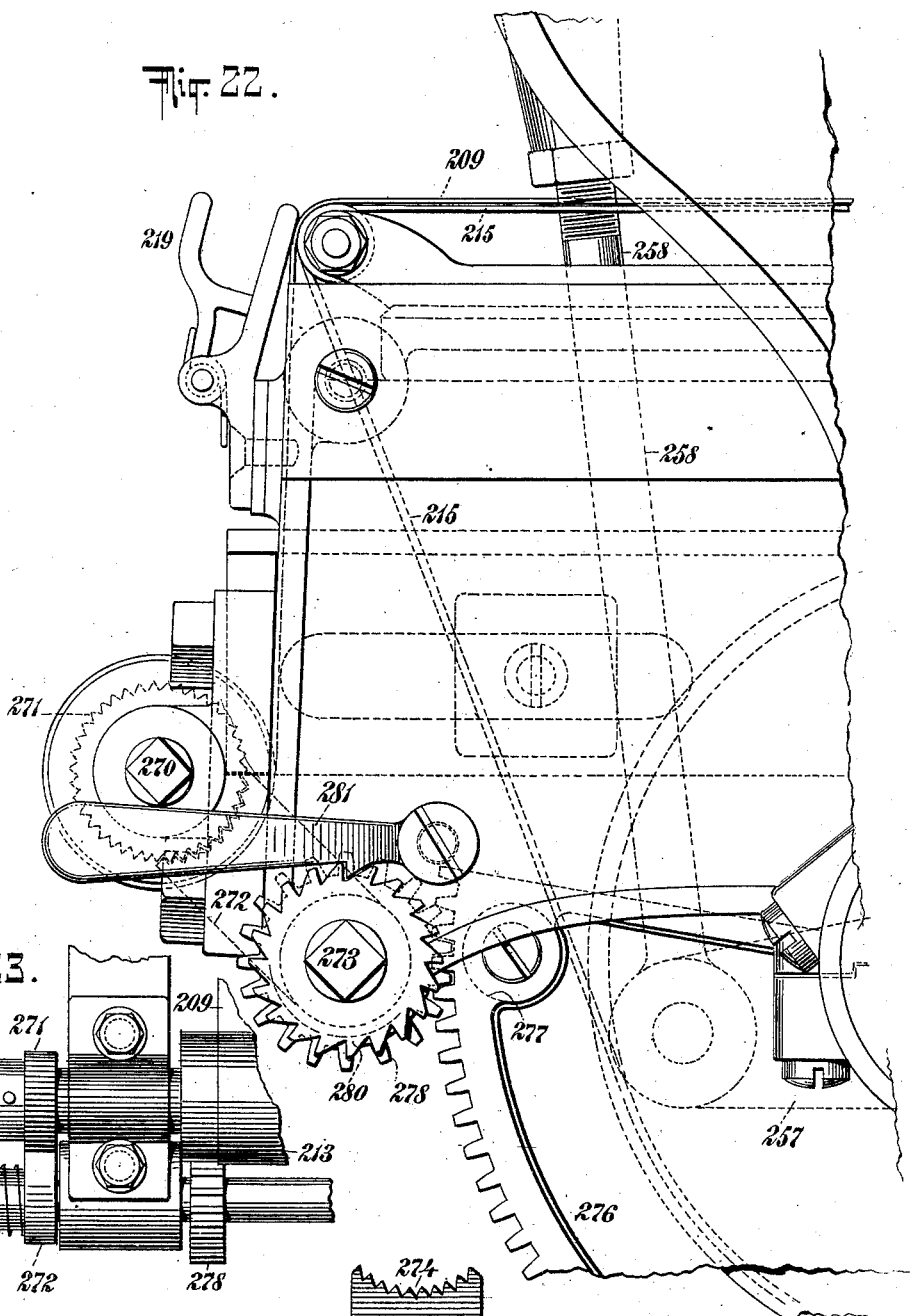
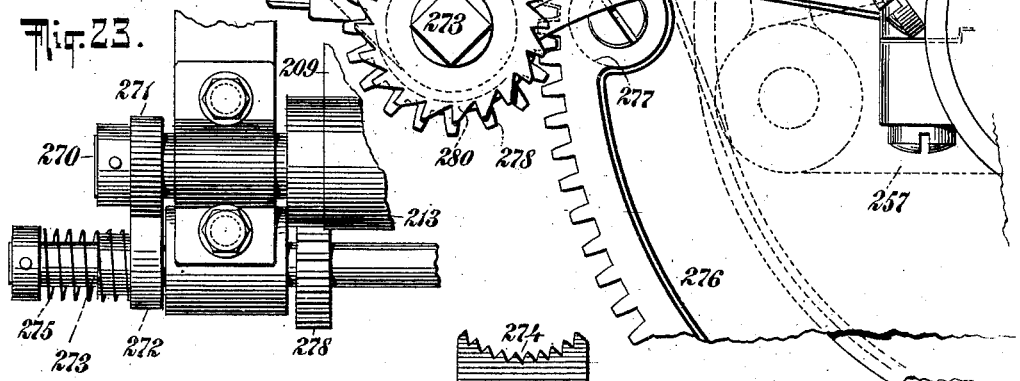
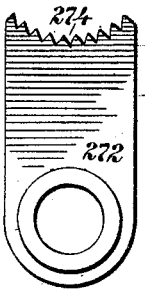
WITNESSES:
Gustave Dieterich.
Edwin H. Dieterich.
INVENTOR
John R. Williams
BY
Chas. E. Gill
ATTORNEY No. 707,748. Patented Aug. 26, 1902.
J. R. WILLIAMS.
CIGAR BUNCHING MACHINE.
(Application filed June 13, 1902.)
(No Model.) 20 Sheets—Sheet 13.

WITNESSES:
Gustave Dieterich
Edwin H. Orietind

INVENTOR
John R. Williams
BY Chas. E. Gill
ATTORNEY

No. 707,748. Patented Aug. 26, 1902.
J. R. WILLIAMS.
CIGAR BUNCHING MACHINE.
(Application filed June 13, 1902.)
(No Model.) 20 Sheets—Sheet 14.
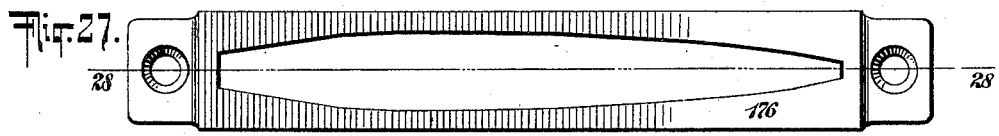
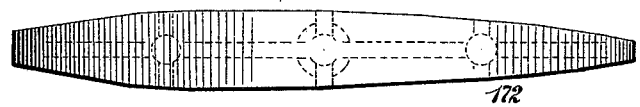
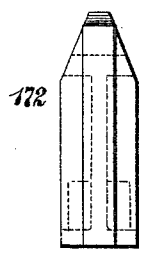
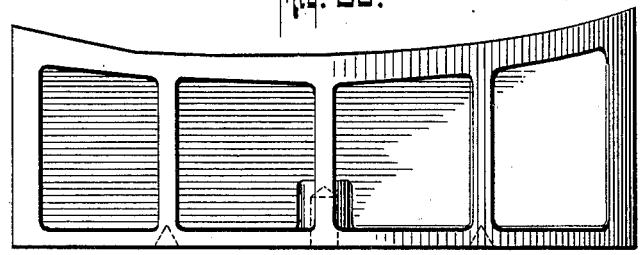
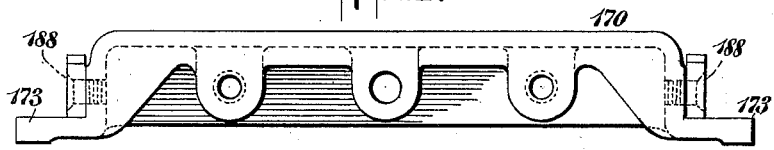
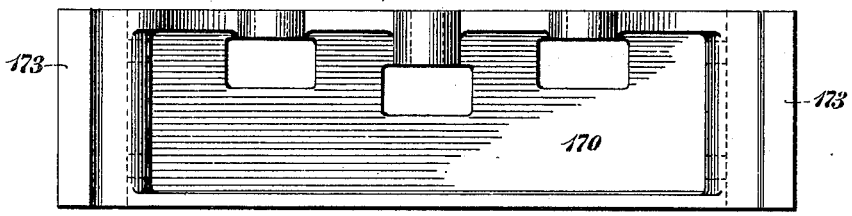
WITNESSES:
Gustave Dieterich
Edwin H. Dieterich
INVENTOR
John R. Williams
BY
Chas. C. Gill
ATTORNEY
THE NORRIS PETERS CO., PHOTO-LITHO., WASHINGTON, D. C.

No. 707,748. Patented Aug. 26, 1902.
J. R. WILLIAMS.
CIGAR BUNCHING MACHINE.
(Application filed June 13, 1902.)
(No Model.) 20 Sheets—Sheet 15.
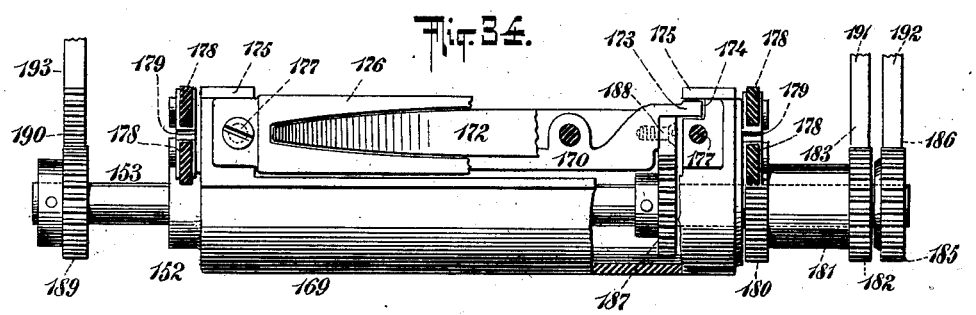
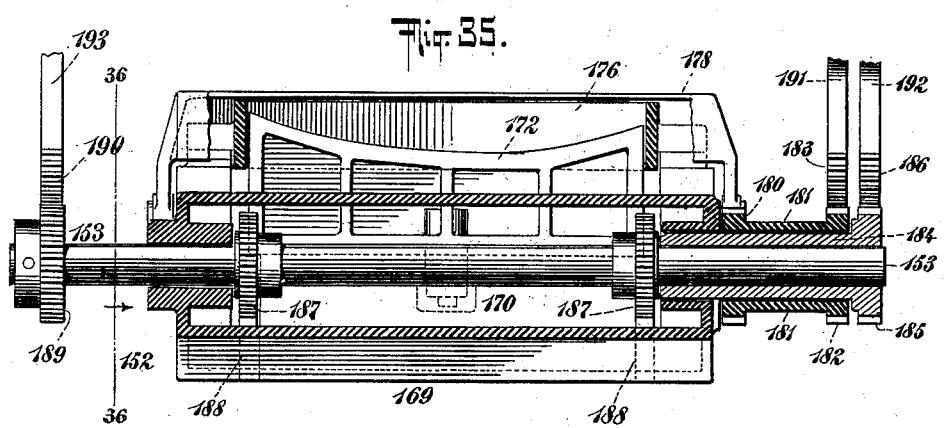
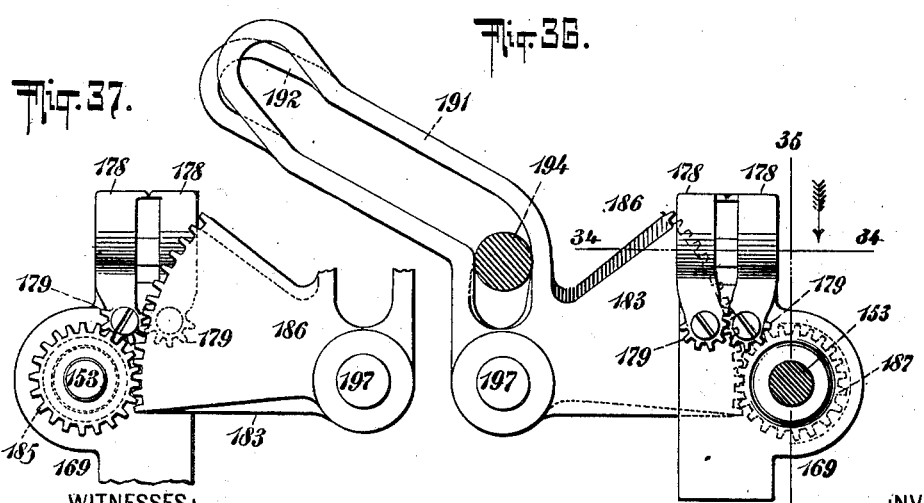
WITNESSES:
INVENTOR
John R. Williams
BY
ATTORNEY

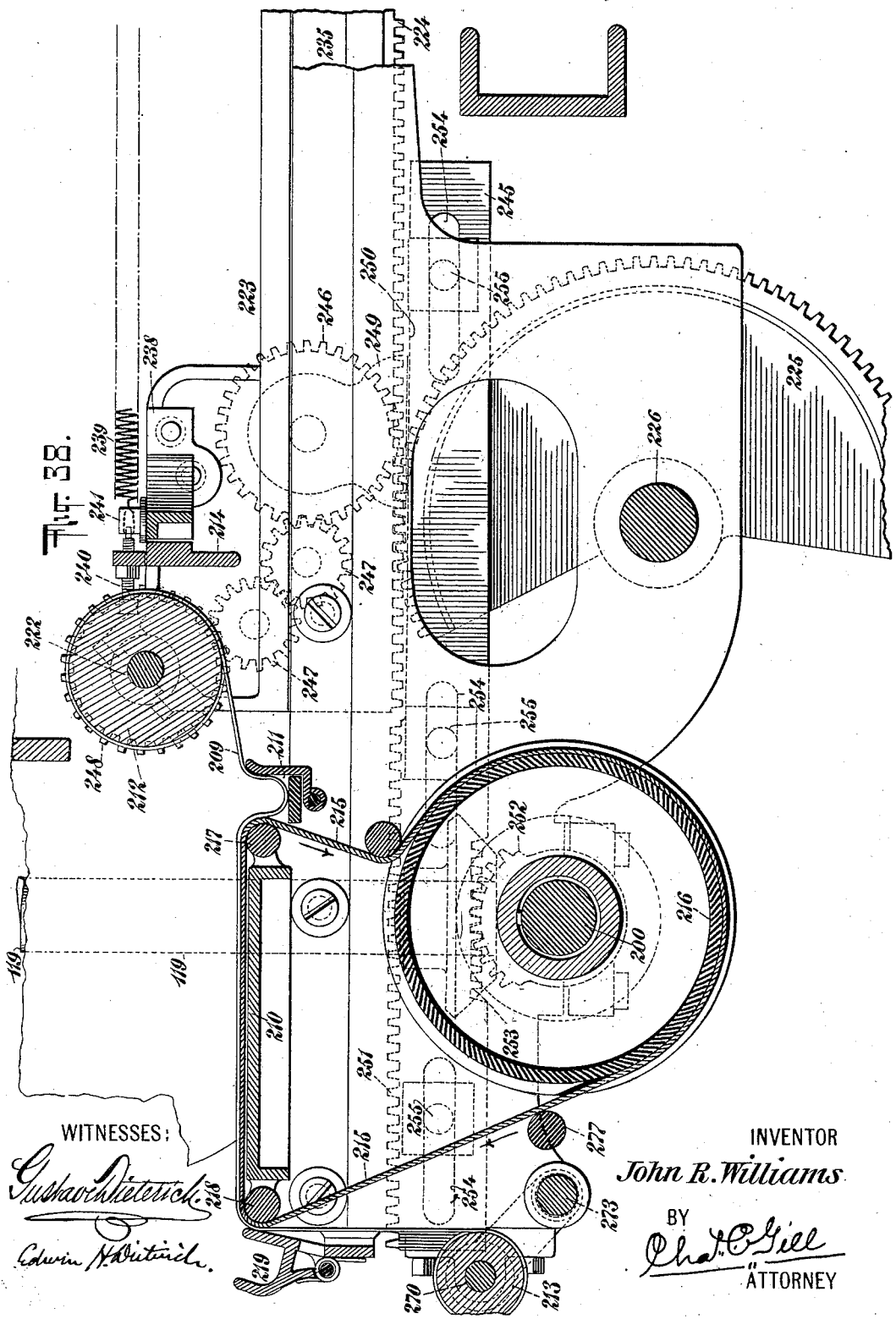

No. 707,748. Patented Aug. 26, 1902.
J. R. WILLIAMS.
CIGAR BUNCHING MACHINE.
(Application filed June 13, 1902.)
(No Model.) 20 Sheets—Sheet 17.
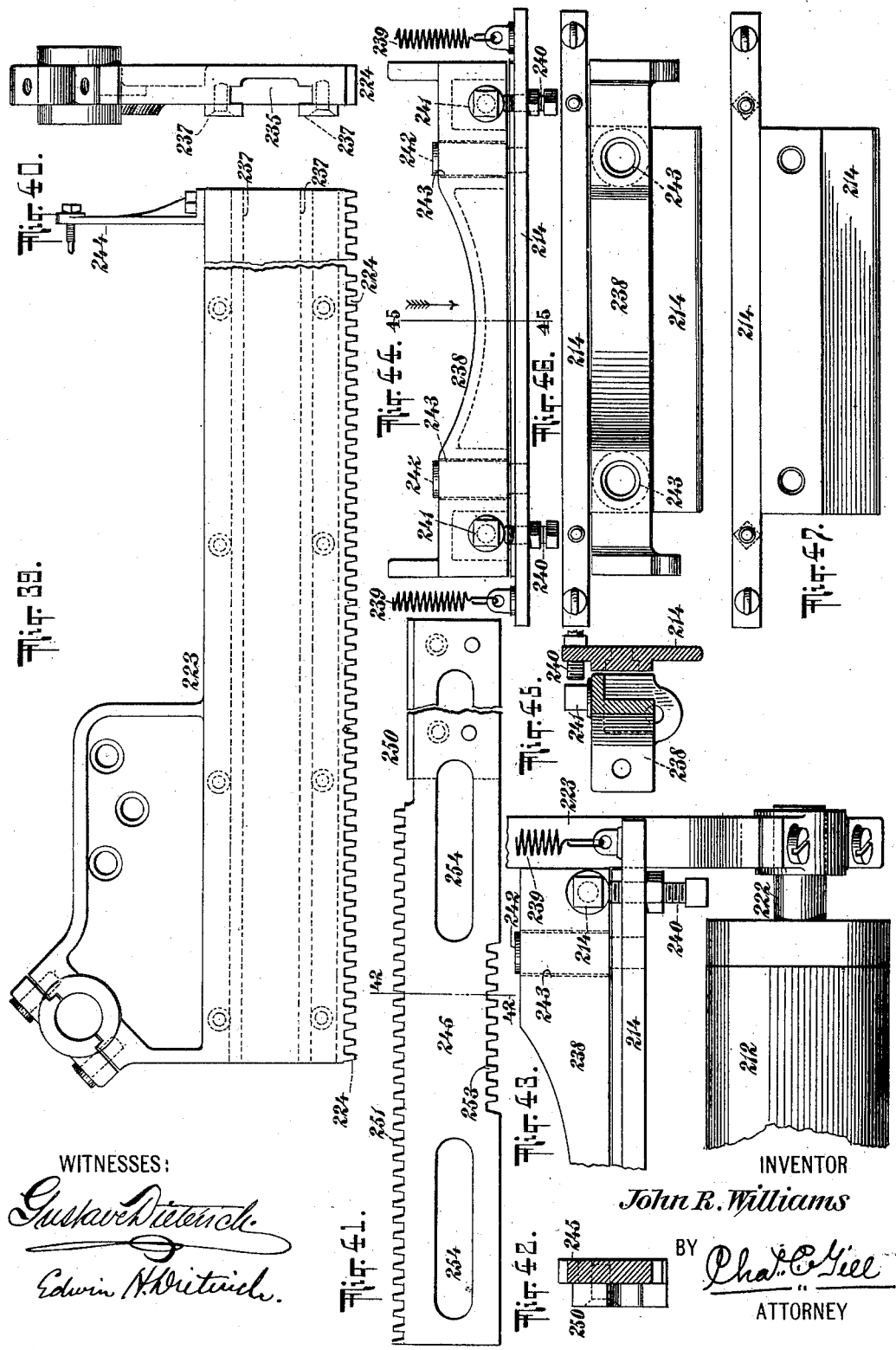
WITNESSES:
Gustave Dieterich
Edwin H. Dieterich
INVENTOR
John R. Williams
BY
Chas. C. Gill
ATTORNEY No. 707,748. Patented Aug. 26, 1902.
J. R. WILLIAMS.
CIGAR BUNCHING MACHINE.
(Application filed June 13, 1902.)
(No Model.) 20 Sheets—Sheet 18.
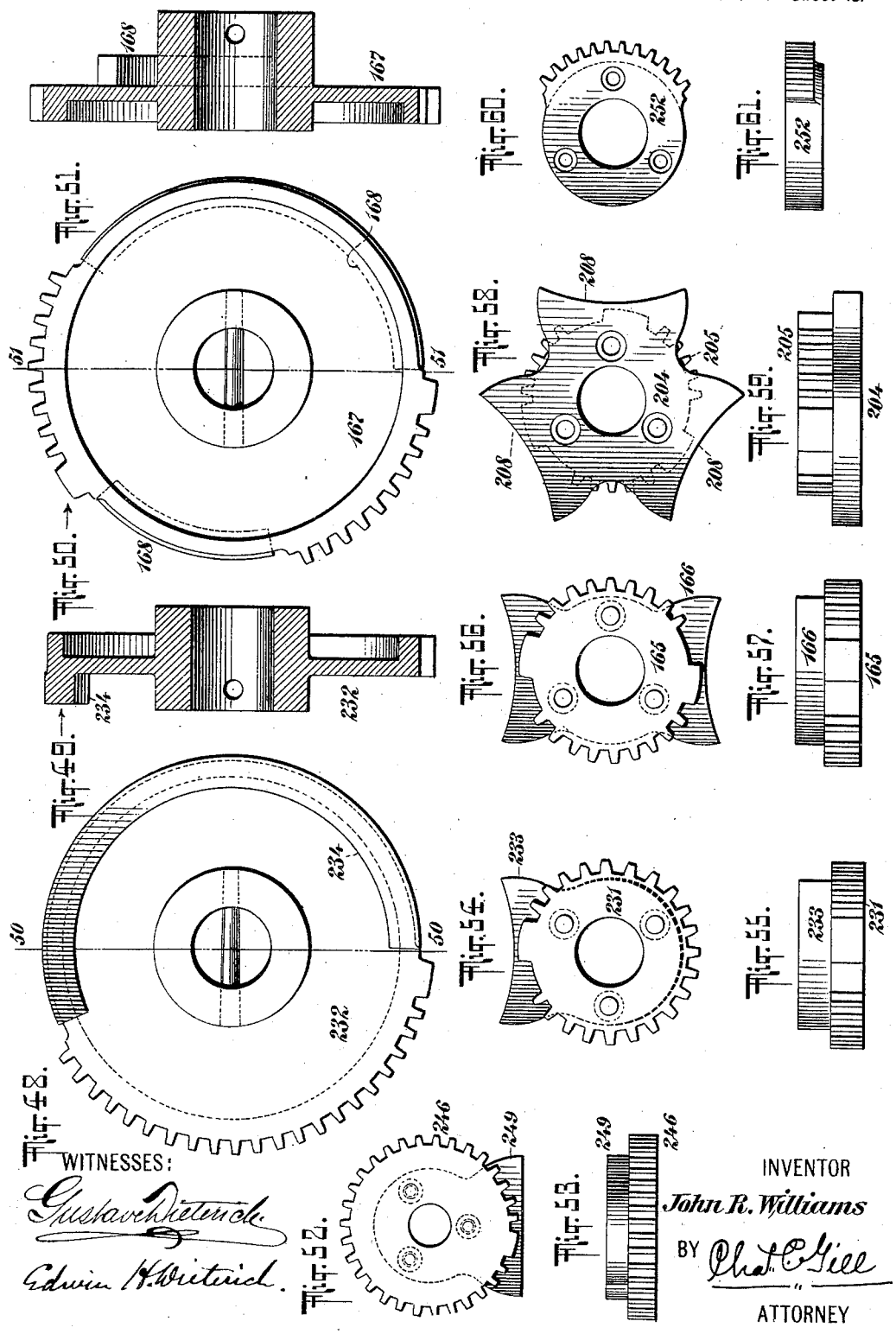
WITNESSES:
Gustave Dieterich
Edwin H. Dieterich
INVENTOR
John R. Williams
BY Chas. C. Gill
ATTORNEY No. 707,748. Patented Aug. 26, 1902.
J. R. WILLIAMS.
CIGAR BUNCHING MACHINE.
(Application filed June 13, 1902.)
(No Model.) 20 Sheets—Sheet 19.
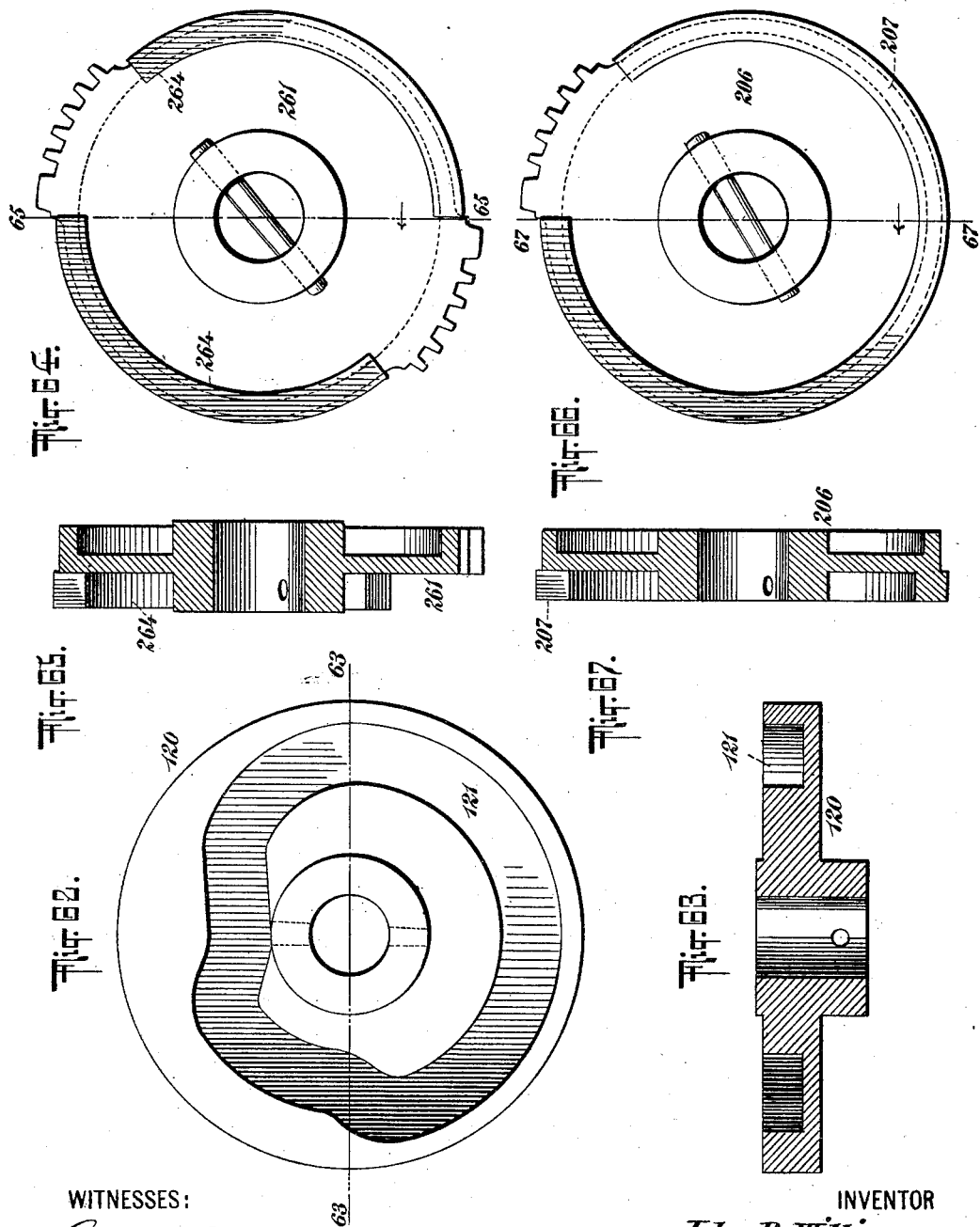
WITNESSES:
INVENTOR
John R. Williams
BY
ATTORNEY

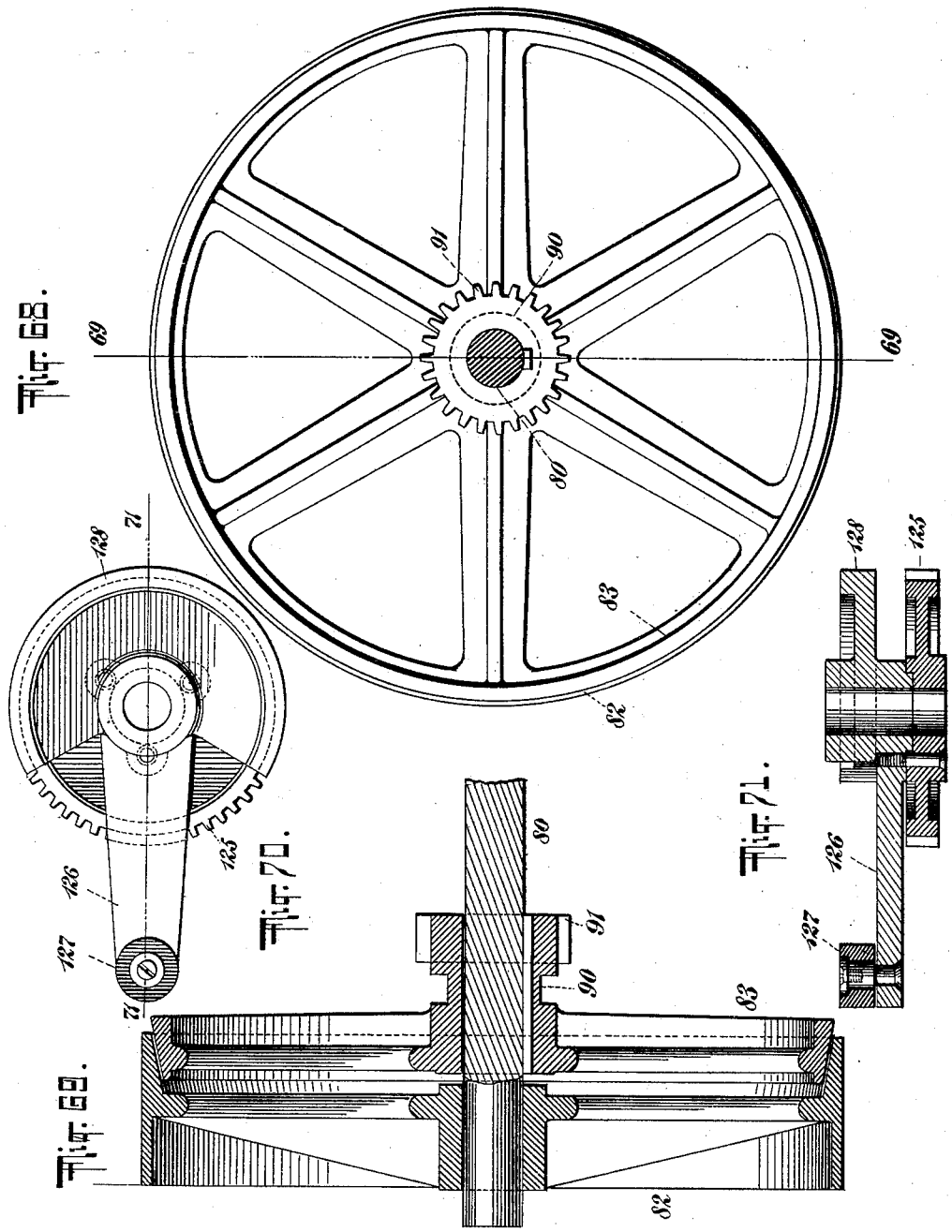

UNITED STATES PATENT OFFICE.

JOHN R. WILLIAMS, OF EAST ORANGE, NEW JERSEY, ASSIGNOR TO THE JOHN R. WILLIAMS COMPANY, OF NEW YORK, N. Y., A CORPORATION OF NEW YORK.

CIGAR-BUNCHING MACHINE.

SPECIFICATION forming part of Letters Patent No. 707,748, dated August 26, 1902.

Application filed June 13, 1902. Serial No. 111,509. (No model.)

*To all whom it may concern:*

Be it known that I, JOHN R. WILLIAMS, a citizen of the United States, and a resident of East Orange, in the county of Essex and State of New Jersey, have invented certain new and useful Improvements in Cigar-Bunching Machines, of which the following is a specification.

The invention relates to improvements in cigar-bunching machines; and it consists in the novel features, arrangements, and combinations of parts hereinafter described, and particularly pointed out in the claims.

I present my invention in this application as embodied in a cigar-bunching machine comprising a horizontal table adapted to have an intermittent rotary motion and containing a series of pockets to receive and feed inward the tobacco for the fillers of the bunches, a series of adjustable yielding plungers adapted to press the proper quantity of filler-tobacco from the pockets of said table into a vertically-movable receiver therefor, knives for removing the surplus filler-tobacco which may be present in the pockets of said table from that portion of the tobacco pressed into said receiver by said plungers, said knives forming the bottom of said pockets and said surplus tobacco removed by them remaining in said pockets, means for actuating said receiver to convey the charges of filler-tobacco from said table to a rolling-apron, upon which an operator will place the binders, means for rolling the bunches, and means for imparting the proper movements to the several parts of the machine.

The object of the invention is to produce a more efficient cigar-bunching machine than those heretofore known and one adapted for the making of long-filler bunches in a rapid, economical, and reliable manner.

In the employment of the machine made the subject hereof two operators are required, one to place the filler-tobacco in the pockets of the rotary feed-table and the other to apply binders upon the rolling-apron and to remove the finished bunches from the machine.

The invention and satisfactory means for carrying the same into effect will be fully understood from the detailed description hereinafter presented, reference being had to the accompanying drawings, in which—

Figure 25:
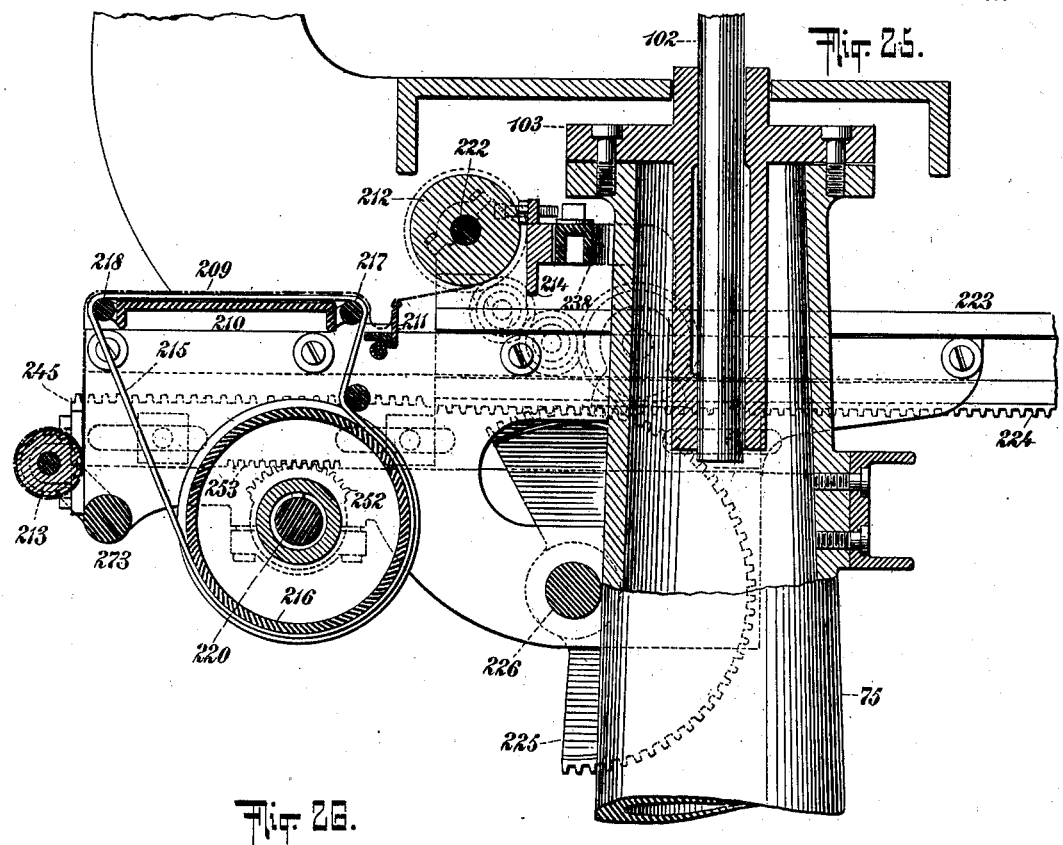
Figure 26:
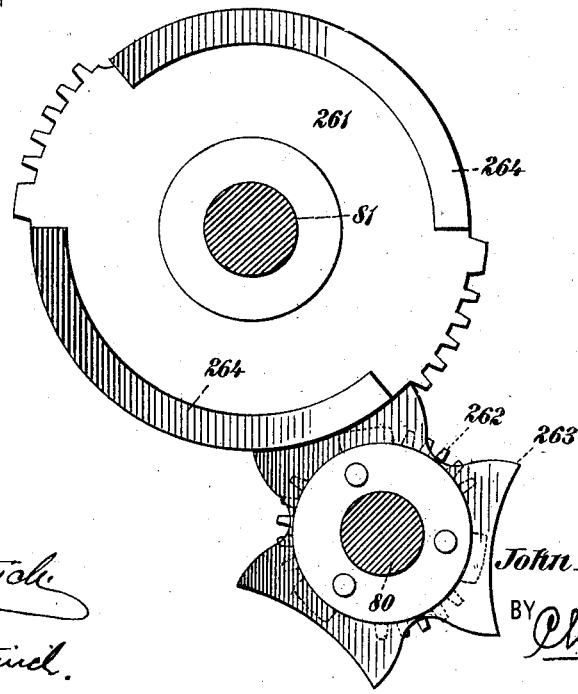

Figure 1 is a side elevation of the upper portion of a machine constructed in accordance with and embodying the invention. Fig. 2 is an enlarged side elevation of a part of the gearing constituting a part of the mechanism and hereinafter specifically referred to, the shafts upon which said gearing are mounted being shown in section. Fig. 3 is an edge view of same, Fig. 2 being a view looking at the right-hand side of Fig. 3. Fig. 4 is a side elevation, corresponding with Fig. 1, of the lower portion of the machine. Fig. 5 is a front elevation of the upper portion of the machine. Fig. 6 is a top view, partly broken away, of same. Fig. 7 is a vertical transverse section through the upper portion of the machine on the dotted line 7 7 of Fig. 6. Fig. 8 is an enlarged side elevation of a part of the gearing of the machine to be hereinafter specifically referred to, the shafts for said gearing being shown in section. Fig. 9 is a bottom view, partly broken away, of the rotary feed-table for the filler-tobacco and illustrating the knives which form the bottoms for the pockets in said table and which knives are employed to sever the surplus tobacco which may have been placed in said pockets from the proper quantity thereof for the fillers for the bunches. Fig. 10 is a vertical section of same on the dotted line 10 10 of Fig. 9. Fig. 11 is a front elevation, partly broken away, corresponding with Fig. 5, of the lower portion of the machine. Fig. 12 is an enlarged rear elevation, partly broken away, of the upper portion of the machine. Figs. 13 and 14 are side and edge views, respectively, of a detached toothed arm forming a portion of the operating mechanism of the machine and specifically designated hereinafter. Fig. 15 is a horizontal section, partly broken away, through the machine, taken on the dotted line 15 15 of Fig. 16 and illustrating the rotary feed-table in dotted lines, Fig. 15 disclosing in top elevation the means for actuating the rotary feed-table and knives carried thereby and showing the upper end of the receiver by which the charges of filler-tobacco are conveyed to the rolling-apron, the upper end of said receiver being open. Fig. 16 is a central vertical longitudinal section through a portion of the machine on the dotted line 16 16 of Fig. 15. Fig. 17 is a central vertical thransverse section through a portion of the machine on the dotted line 17 17 of Fig. 16, Fig. 17 illustrating more particularly the vertically-movable receiver by which the charges of filler-tobacco are conveyed to the rolling-apron and the means for actuating the parts connected with said receiver. Fig. 18 is a detached top view of the cam located directly below the rotary feed-table for controlling and actuating the knives carried by said table below the pockets therein. Fig. 19 is a section of same on the dotted line 19 19 of Fig. 18. Fig. 20 is a detached top view of a plate forming a part of the means for imparting to the feed-table its intermittent rotary movement. Fig. 21 is a sectional view of same on the dotted line 21 21 of Fig. 20. Fig. 22 is an enlarged side elevation, partly broken away, of the lower rear portion of the machine, whence the finished bunches are removed from the machine. Fig. 23 is a detached rear elevation of a portion of the mechanism for adjusting the rolling-apron. Fig. 24 is a detached side elevation of a toothed bar forming a detail of same. Fig. 25 is a central vertical longitudinal section through the lower rear portion of the machine and illustrates a portion of the rolling mechanism. Fig. 26 is a detached side elevation of a part of the operative gearing of the machine hereinafter specifically designated, the shafts for said gearing being shown in section. Figs. 27 to 33, inclusive, are detached views of the several parts of the charge-receiver which conveys the filler-tobacco from the feed-table to the rolling-apron, these parts being specifically designated hereinafter. Fig. 34 is a top view, partly broken away, of a portion of the charge-receiver, Fig. 34 being also partly in section on the dotted line 34 34 of Fig. 36. Fig. 35 is a vertical longitudinal section of a portion of the mechanism connected with the charge-receiver, this section being on the dotted line 35 35 of Fig. 36. Fig. 36 is a detached side elevation of a part of the gearing located at the left-hand side of the rear end of the machine for opening and closing the hinged lids for the charge-receiver and for reversing said receiver on its descent to deliver the charge of filler-tobacco to the rolling-apron and restoring said receiver to its upright position upon its return upward to receive another charge of filler-tobacco. Fig. 37 is a further detailed view of same, Fig. 37 showing the segment and gear-wheel by full lines. Fig. 38 is a central vertical longitudinal section through a portion of the machine and is presented to more clearly illustrate the means for rolling the bunch. Fig. 39 is a detached side elevation, partly broken away, of the left-hand side of the sliding frame carrying the roller for aiding in rolling the bunch. Fig. 40 is an end view of same. Fig. 41 is a detached side elevation, partly broken away, of a sliding rack-bar for coöperation with the frame represented in Fig. 39. Fig. 42 is a vertical section of same on the dotted line 42 42 of Fig. 41. Fig. 43 is a detached top view of a portion of the frame shown in Fig. 39 and a portion of the roller and coöperating pressure-blade for aiding in rolling the bunch. Fig. 44 is a detached top view of the said pressure-blade and some of its coöperating parts. Fig. 45 is a vertical section of same on the dotted line 45 45 of Fig. 44. Fig. 46 is an elevation of same looking in the direction of the arrow in Fig. 44. Fig. 47 is a like view of a portion of same. Figs. 48 to 67, inclusive, are detached views of various parts of the operative gearing of the machine, and these parts will be specifically designated hereinafter. Fig. 68 is a detached vertical section through the driving-shaft of the machine and illustrates in side elevation the clutch mechanism. Fig. 69 is a vertical section of same on the dotted line 69 69 of Fig. 68. Fig. 70 is a detached top view of the crank-arm and connected parts forming a part of the mechanism for imparting an intermittent motion to the rotary feed-table, and Fig. 71 is a vertical longitudinal section of same on the dotted line 71 71 of Fig. 70.

In the drawings the general frame of the machine is illustrated as being comprised of the pedestal-base 75, Fig. 4, a frontwardly-extending horizontal portion 76, and vertical side frames 77 78, the rotary feed-table 79 being above the said horizontal portion 76 and said side frames 77 78 affording at their upper portions suitable bearings for the shafts 80 and 81.

The power for operating the machine will be applied to the usual belt-wheel 82, which is adapted to be engaged by the clutch member 83 on the shaft 80 and which clutch member in a usual manner will be operated from a foot-treadle 84, Fig. 4, through the intermediate connecting-rod 85 and the bell-crank lever 86, Fig. 11, connected to said rod and having one arm pivotally secured to the lower end of the clutch-lever 87, whose upper portion, as indicated in Figs. 5 and 6, is bifurcated and carries pins within a groove of the sleeve 90, connected with said clutch member 83, Figs. 5 and 69, and formed integrally with the pinion-wheel 91. The foot-treadle 84 is normally held in an upward position by means of the spring 88, Fig. 4, and consequently the clutch member 83 is held normally free of the belt-wheel 82. When the machine is to be started in motion, the operator will press her foot upon the treadle 84 for the purpose of throwing the clutch member 83 outward into engagement with the belt-wheel 82, and upon the removal of her foot from the treadle 84 the spring 88 will elevate the latter and through the intermediate rod 85, bell-crank lever 86, and lever 87 disengage the clutch member 83 from the wheel 82, thereby stopping the machine, while permitting the wheel 82 to rotate idly. The transmission of power from the belt-wheel 82 is on well-understood principles through the pinion 91, Fig. 5, gear-wheel 92, pinion 93, gear-wheel 94, pinion 95, and gear-wheel 96. The various gears on the shafts 80 81 will be described hereinafter in connection with the explanations to be given of the duties they perform.

The rotary table 79 is in the form of a horizontal disk, containing near its outer edges the series of elongated apertures 97, Figs. 7, 9, 16, within which are secured the molds or formers 98, which are open at their lower end and flanged at their upper end, Figs. 6, 7, 16, and conform approximately to the shape of a cigar. The molds or formers 98 will vary in shape and size in accordance with the shape and size of the bunches to be produced, and the elongated apertures 97 in the table 79 will hence be of a size and shape to receive the varying sizes of molds 98, so that when it is desired to vary the character of the bunch to be produced it will not be necessary to disturb the table 79, but only to change the molds 98. The table 79 is fastened, by screws 99, upon the upper end of the hub 100, Figs. 6, 7, 15, 16, 20, 21, of the radially-slotted plate 101, which is mounted on the vertical spindle 102, held in the cap 103, Figs. 16 and 25, secured upon the upper end of the pedestal-base 75. The plate 101 is the element through which an intermittent motion is imparted to the rotary table 79, and when said table 79 is formed with six of the molds or formers 98, as shown, the said plate 101 will be formed with six of the radial slots 104. The intermittent motion of the table 79 is for the purpose of enabling said table to carry its molds 98 in succession below the series of plungers 105, hereinafter described, by which the tobacco is pressed downward through said molds, said plungers being located at a fixed point. With the arrival of one of the molds 98 below the plungers 105 the table 79 will come to a rest until said plungers have moved downward and then ascended to their upper initial position. The means for imparting motion to the plate 101 and through the latter to the rotary table 79 will presently be described.

Upon the hub 100 of the plate 101 is mounted the cam-wheel 106, Figs. 7, 15, 16, 18, and 19, having the cam-groove 107, receiving the rollers 108, depending from the plates 109, adapted to slide within the radial guides 110, Figs. 9 and 16, fastened to the lower side of the rotary table 79, the said plates 109 having secured to them the knife-blades 111, which form bottoms for the molds or formers 98 and at the proper time serve to sever the surplus filler-tobacco which may be present in the molds 98 from that portion of the tobacco pressed into the receiver, hereinafter described, by means of the plungers 105, the surplus tobacco removed by said knives remaining within the said molds 98. The cam-wheel 106 has a rotary action for a time with the table 79 and then reversely to said table, and the purpose of said cam-wheel 106 is to control the series of knife-blades 111, maintaining all of said blades below the molds 98, except at such time as one of said molds is below the plungers 105, and is to have its contents or a portion thereof discharged into the receiver, at which time one of said blades 111, being the one below the plungers 105, will move inward from the bottom of its mold 98 to allow the plungers 105 to act, and will then move outward to sever such portion of the filler-tobacco as may still be within the mold 98 from that portion thereof pressed through the lower end of said mold by means of the plungers 105. It may be observed upon reference to Fig. 18 that the groove 107 in the knife cam-wheel 106 is concentric except at a point numbered 112, where said groove 107 turns inward and its walls form the cam-surfaces 113 and 114, and it will be understood, therefore, that while the rollers 108, connected with the blades 111, are within the regular or concentric portion of the cam-groove 107 the said blades 111 will have no sliding movement, but will remain stationary except as they may travel with the table 79. When, however, the cam-wheel 106 carries its inwardly-extending portion 112 against the roller 108, connected with the blade 111, then below the plungers 105, the said blade 111 thus positioned will be given first an inward motion from below its mold 98 and then an outward motion to its former position, (shown in Fig. 16,) the said blade 111 while performing its outward motion causing its outer sharpened edge to sever the surplus tobacco then within said mold from that portion thereof which at the time will have been pressed downward through the lower end of the said mold by the plungers 105. It will thus be understood that all of the knife-blades 111 will remain at rest, closing the lower ends of the molds 98, except as said blades are one after another carried below the plungers 105, where they will be subjected to the action of the inwardly-extending portion 112 of the cam-wheel 106. The cam-wheel 106 does not have a full rotation. It moves with the rotary table 79 for a definite distance and then performs a reverse rotation back to its initial position.

Upon the hub of the cam-wheel 106 is rigidly secured the gear-wheel 115, Figs. 7, 11, 16, 15, which is engaged by the pivotally-mounted segment 116, Figs. 11 and 15, formed with a lever-arm 117, which is pivotally secured to a sliding rod 118, whose outer bifurcated end guides upon the vertical shaft 119, from which said rod 118, arm 117, and segment 116 receive their motion to operate the knife-cam 106 through the cam 120, secured on said shaft 119 and engaging with the groove 121, Figs. 62 and 63, formed in its lower face, the vertical roller-stud 122, Figs. 11, 15, carried by the said rod 118. The groove 121 of the cam 120 is given the special outline particularly shown in Fig. 62 so that it may, through the rod 118, bell-crank segment 116, and gear 115, first cause the knife-cam 106 to rotate in a direction with the table 79 until the latter carries a mold 98 below the plungers 105 and comes to rest, then cause the knife-cam 106 to perform a reverse motion until the inward projection 112, Fig. 18, of its groove 107 moves against the roller 108 of the knife-blade 111, then below the said mold 98, then cause said knife-cam 106 to remain at rest, holding said blade 111 inward from said mold 98 while the plungers 105 descend to eject the tobacco from said mold and ascend, and then cause said knife-cam 106 to perform a further reverse motion to its initial position, whereby the second half of said projection 112 is carried against the said roller 108 of said blade 111 and the latter is driven outward to its former position below said mold 98, and while moving outward said blade 111 will sever the surplus tobacco then in the mold 98 from that portion of the tobacco pressed below said mold by the plungers 105, and thereupon the rotary table 79 will start to perform another division of its rotation and the cam 106 will move with it, as before, until said table again comes to rest with one of its molds 98 below the plungers 105, when the said cam 106 will again perform its reverse motion above described to actuate the blade 111 then below the said plungers. The rotary table 79 also receives its intermittent motion from the vertical shaft 119 through intermediate mechanism acting on the slotted plate 101, connected with said table, said mechanism comprising the gear-wheel 123, Figs. 11 and 15, secured on said shaft 119, the intermediate idler gear-wheel 124, the gear-wheel 125, in mesh with said gear-wheel 124, and the crank-arm 126, connected with said gear-wheel 125, so as to perform a rotary motion therewith. The end of the crank-arm 126 is provided with a roller 127, adapted to enter the radial slots 104 of the plate 101, and in Fig. 15 the roller 127 is shown as having emerged from one of said slots 104. During the rotation of the crank-arm 126, looking at Fig. 15, said arm will move outward from the position in which it is shown in Fig. 15 and travel on the line of a circle and finally enter a slot 104 of the plate 101 and, engaging the walls of said slot, cause said plate 101 to perform in the present instance one-sixth of a rotation, thereby carrying one of the molds 98 from below the plungers 105 and moving another one of said molds 98 below said plungers. It is only during a portion of the movement of the crank-arm 126 that its roller 127 engages the slotted plate 101, and the said plate 101 and rotary table 79 only move when they are actuated by the contact of the said roller 127 with the walls of the slots 104 of said plate. The crank-arm 126, although in itself making a full rotation, only actuates the slotted plate 101 and feed-table 79 to perform one-sixth of a rotation.

It is desirable that when the roller 127, carried by the crank-arm 126, leaves a slot 104 of the plate 101 the said plate 101 and its table 79 shall be rigidly locked in stationary position, because it is then that a mold 98 shall be directly below and in condition to receive the plungers 105, and hence I provide means for holding the plate 101 at rest after each of its intermittent motions until such time as it is proper for the rotary table 79 to again start in motion. The means for locking the plate 101 in stationary position comprise the concentric segmental flange 128, fastened upon but rising above the gear-wheel 125, and the coöperating segmental recesses 129, formed in the edges of the plate 101 intermediate the slots 104 thereof. Upon the roller 127, carried by the crank-arm 126, leaving a slot 104 of the plate 101 the flange 128 will immediately enter the then adjoining segmental recess 129 of said plate 101 and serve as a lock to prevent said plate 101 from turning, and the said flange 128 will continue to hold the plate 101 stationary until it has left the said recess 129, which will take place when the roller 127 of the crank-arm 126 has moved into position to enter another slot 104 of the plate 101 for the purpose of again starting the latter in motion. The flange 128 being concentric may be carried by a gear-wheel 125 without interfering with the continued motion of said gear-wheel, and during the rotation of said gear-wheel 125 the said flange 128 will simply travel idly within the adjoining recess 129 of the plate 101 without performing any office other than to prevent the plate 101 from rotating. The rotary table 79 thus receives its intermittent motion from the vertical shaft 119 through the gear-wheels 123, 124, 125, and crank-arm 126, and slotted plate 101, and the said table 79 is held stationary at the end of each of its movements by means of the flange 128, carried by the gear-wheel 125, coöperating with one of the recesses 129 of said plate 101. The form and construction of the flange 128, crank-arm 126, and gear-wheel 125 are shown in detail in Figs. 70 and 71, Fig. 70 being a plan view and Fig. 71 a section of same. The knife-blades carried by the rotary table 79 are controlled from the cam 120, also mounted on the vertical shaft 119, said cam operating through the rod 118, bell-crank segment 116, gear-wheel 115, and knife-cam wheel 106. The vertical shaft 119 receives its motion from the bevel gear-wheels 129 130. (Shown in Figs. 5 and 6.)

The plungers 105 are arranged in series, Figs. 5 and 12, and in series define at their lower surface the outline of the molds 98 they are when moved downward to enter, and the said plungers are small plates secured to the series of independent vertical rods 131, which extend through recesses in the edges of the transverse bars 132 133, whose ends are in the form of sleeves 134, mounted on the vertical rods 135, held at their upper and lower ends by brackets 136. The bars 132 133 are connected at their ends by the vertical bars 137, Figs. 5 and 7, which with said bars 132 133 form a rectangular vertically-movable frame carrying the plungers 105 and their rods 131. The rods 131 are held in the edge recesses of the transverse bars 132 133 by means of the auxiliary bars 151 151, held against the edges of the bars 132 133 by means of the screws 150, said bars 151 being at the rear vertical side of said bars 132 133, as shown in Figs. 7 and 12. Upon removing the bars 151 all or any number of the plunger-rods 131 may be withdrawn, and this is a matter of convenience, since when the molds 98 are changed for making longer or shorter bunches, for illustration, it is desirable that the plungers 105 may be conveniently removed in whole or in part and at times that other plungers larger or smaller in size may be substituted for those already in the machine. The plunger-rods 131 will be polygonal in cross-section and the recesses receiving them in the edges of the bars 132 133 will be correspondingly shaped, so that said rods 131 may not turn axially. The plungers 105 are held in proper initial relation to each other by means of the blocks or stops 138, which are fastened on the rods 131 and bear against the upper surface of the bar 132, Figs. 5, 7, and 12, said blocks 138 being yieldingly held against said bar 132 by the independent springs 139, whose upper ends are fastened upon the transverse rod 140, connecting the vertical bars 137, while the lower ends of said springs 139 carry stirrups 141, passing upon and engaging the teeth of the notched levers 142, Figs. 7, 13, 14, and 16, which are pivotally mounted on the transverse rod 143, carried by the bars 137, and have bifurcated rear ends straddling the rods 131 and bearing on the blocks 138, said rear ends being constantly held against said blocks under the tension of the springs 139, whose force may be varied or adjusted as desired by moving the stirrups 141 outward or inward along the front notched ends of said levers 142, said levers being notched to engage and permit the adjustment of said stirrups. The blocks or stops 138 are held by pins on the rods 131, and hence by varying the position of the said blocks or stops 138 on said rods the plungers 105 may be given different positions, whereby instead of said plungers being on a horizontal plane, as shown, some of them may be above the others, so as to vary their effect on the filler-tobacco in accordance with the special character of the bunches to be produced. The springs 139 are as to the force they shall exert independently adjustable, and hence the pressure the plungers 105 separately or collectively shall exert on the tobacco may be varied and regulated at will without any alteration of the blocks 138, in accordance with the nature of the tobacco and character of result desired.

The frame, comprising the transverse bars 132 133, vertical bars 137, and transverse rods 140 143 and carrying the series of plungers 105, springs 139, and levers 142, is given a vertical movement downward and then upward, the downward motion of said frame being to cause the plungers 105 to descend against the tobacco in the mold 98, then below them, for the purpose of pressing the tobacco through the lower end thereof and into the receiver, hereinafter described, by which the filler-tobacco is conveyed to the rolling mechanism. The plungers 105 are independently yielding, and hence while pressing the filler-tobacco through the mold 98 and into said receiver they will not pack or solidify the tobacco either in spots or throughout.

While the present invention is not wholly limited to the series of independent plungers 105, the whole forming a sectional plunger as distinguished from a single plunger of adequate size, I find that superior results are attained with the use of the series of plungers arranged as shown.

The aforesaid frame carrying the series of plungers 105 receives its vertical movement from the eccentric 144, Figs. 5 and 7, and eccentric-rod 145, which is pivotally secured to the upper bar 133 of said frame. The eccentric 144 is free on the shaft 80, but is connected with the gear-wheel 146, having the locking-plate 147 and to be engaged by the segmental series of teeth of the gear-wheel 148, which has a plain concentric flange 149 to engage said plate 147 and hold the same and the gear-wheel 146 stationary after the teeth of the gear-wheel 148 have passed beyond the said gear-wheel 146, which will be when the plungers 105 and their frame are in their upper position. The gear-wheel 148, with its flange 149, and the gear-wheel 146, with its locking-plate 147, are well-known mechanical devices and are clearly illustrated in Figs. 2 and 54. The eccentric 144 is thus actuated from the gear-wheel 148 and gear-wheel 146 to move the plungers 105 and their frame downward and then upward, and when said plungers and frame have returned to their upward position they will be held stationary by the flange 149 on the wheel 148 engaging and moving against the curved end of the locking-plate 147, the wheel 148 and shaft 81 being thus permitted to continue in motion, so that said shaft may perform its further duties after the plungers 105 have performed their work and come to rest.

The receiver, numbered as a whole 152, for receiving the charge of filler-tobacco from the molds 98 as they are in succession brought below the plungers 105 and conveying said charges to the rolling mechanism is shown more clearly in Figs. 7, 12, 15, 16, 17, and 27 to 33, inclusive. The receiver 152 is in an upright position, as shown in Fig. 16, when it is below a mold 98 to receive the charge of filler-tobacco; but thereafter the said receiver descends to the rolling mechanism and turns upside down, so that the charge of filler-tobacco may be delivered to the said rolling-mechanism, and during the ascent of the receiver 152 to its former position it will be reversed, so as to again assume an upright position preparatory to receiving another charge of filler-tobacco. The receiver 152 is carried upon a shaft 153, which is carried on the frontwardly-projecting arms 154, Figs. 7 and 16, of the side arms 155 of a rectangular vertically-movable frame comprising the said side arms 155, upper cross-bar 156, Fig. 12, and lower connecting segmental bar 157, this rectangular frame being guided at its edges by the frames 158 and having a direct vertical movement, this movement being imparted to the said rectangular frame by means of the eccentric 159, Figs. 5 and 7, on the shaft 80 and having its arm 160 pivotally connected to a short crank-arm 161, Fig. 7, forming a part of the sleeve 162, freely mounted upon the shaft 81 and provided with a rearwardly-projecting crank-arm 163, Fig. 7, which by means of the rod 164 is connected with the upper transverse bar 156 of the said rectangular frame. The rotation of the eccentric 159 will impart an oscillatory motion to the sleeve 162 on the shaft 81, and this motion of the said sleeve 162 will, through the crank-arm 163 and connecting-rod 164, effect the due vertical movement of the aforesaid rectangular frame comprising the said bars 155, whose lower forwardly-projecting members 154 carry the shaft 153 and receiver 152. The eccentric 159 is connected with the gear-wheel 165, free on the shaft 80, and to this gear-wheel 165 is fastened the locking-plate 166. The gear-wheel 165 operates the eccentric 159, and it receives its motion from the segmental gear-wheel 167 on the shaft 81, which gear-wheel 167 is formed with the lateral flanges 168 to engage the said locking-plate 166 after the teeth of said gear-wheel 167 leave the teeth of the gear-wheel 165. While the teeth of the gear-wheel 167 are turning against the teeth of the gear-wheel 165, the latter and the eccentric 159 will perform a rotary motion for the purpose of moving the receiver 152 in a vertical direction; but it is necessary that the receiver should remain in its upper position a proper length of time to receive the charge of filler-tobacco and then in its lower position a sufficient length of time to discharge the filler-tobacco, and hence the locking-plate 166 and flanges 168 are provided on the gear-wheel 165 and gear-wheel 167, respectively, so that by the engagement of the said flanges 168 with the grooved ends of the locking-plate 166 the gear-wheel 165 and eccentric 159 may be locked in stationary position during a portion of the rotation of the gear-wheel 167. The gear-wheels 167 and 165, locking-plate 166, and flanges 168 are all well-known mechanical devices and their purpose is while effecting the proper movement of the receiver 152 to lock said receiver against movement at such times as it may be desired that said receiver shall remain at rest. The details of the gear-wheels 167 and 165 are shown in Figs. 50, 51, 56, and 57, Figs. 50 and 51 illustrating the gear-wheel 167, having the two lateral flanges 168, and Figs. 56 and 57 illustrating the gear-wheel 165 and locking-plate 166. The longer flange 168 of the gear-wheel 167 will engage one curved end of the locking-plate 166 while the receiver 152 is in its upper position and the shorter flange 168 will engage the other end of the said locking-plate 166 when the receiver 152 is in its lower position, the length of said flanges 168 depending upon the timing of the machine. The gear-wheel 167 is fastened upon the shaft 81 and receives its motion therefrom, while the eccentric 159, gear-wheel 165, and locking-plate 166 are all fastened together in the form of a sleeve free upon the shaft 80. The receiver 152 comprises a frame 169, Figs. 16, 34, 35, 36, and 37, between whose ends is disposed a carrier-frame 170, (shown in detail in Figs. 32 and 33, Fig. 32 being a top view and Fig. 33 a side elevation of same,) and upon this carrier-frame 170 is secured by means of a bolt 171 the plunger 172, which forms the bottom of the cavity for the filler-tobacco in the receiver 152 and is utilized as a means for ejecting the filler-tobacco from the receiver and upon the rolling mechanism when said receiver is in its lower position and reversed. The plunger 172 is shown in side elevation in Fig. 30 and in top elevation in Fig. 29 and in end elevation in Fig. 31, while in Figs. 16, 34, and 35 the said plunger is represented as being in its inner position ready to receive the filler-tobacco. The frame 170 and plunger 172 being connected together will move in unison between the ends of the main frame 169 of the receiver 152. The carrier-frame 170 has at its ends the vertical guiding-lips 173, which are adapted to move in vertical recesses 174, formed in the rear edges of the ends of the frame 169, as indicated in Fig. 34, vertical strips or bars 175 being provided to retain the lips 173 within the said recesses 174. Upon the upper edges of the frame 169 is secured the elongated frame 176, the latter being in the form of an open frame secured by screws 177 and having an interior outline, as shown in Figs. 27 and 34, approximating the outline of a cigar and corresponding with the outline of the upper end of the plunger 172. The frame 176 is shown in top elevation in Fig. 27 and in vertical section in Fig. 28, and the vertical inner walls of the said frame 176 form the cavity for receiving the filler-tobacco pressed downward by the plungers 105. The receiver 152 is equipped with lids 178 for closing at the proper time the upper end of the frame 176, said lids being pivotally secured to the ends of the frame 169, as indicated in Figs. 16, 34, 36, and 37, and being provided at the adjoining portions of the ends of its arms with the intermeshing gears 179, one of which, as clearly illustrated in Figs. 36 and 37, being in engagement with a gear-wheel 180. The gear-wheel 180 and intermeshing gears 179 are for opening and closing the lids 178, these lids being shown in their closed position in Figs. 36 and 37 and in their open position in Fig. 16. The lids 178 will stand in their open position (shown in Fig. 16) when the receiver 152 is in its upper position ready to receive the filler-tobacco, and after the knife-blade 111 has performed its outward motion and severed the surplus tobacco within the mold 98 from that pressed downward below said mold the lids 178 will close over the tobacco then within the frame 176 of the receiver and said receiver will then descend to its lower position, being reversed during its descent and the lids 178 opening outward from each other when said receiver is in its lower position preparatory to the discharge of the tobacco from the frame 176 and to the rolling mechanism. The means for operating the gear-wheel 180 to open and close the lids 178 comprise, primarily, a sleeve 181, Fig. 35, upon the inner end of which the gear-wheel 180 is formed and upon the outer end of which is formed the gear-wheel 182 to be engaged by a segment 183, hereinafter described, the said sleeve 181 being loosely mounted upon a sleeve 184, loosely mounted upon the shaft 153, which sleeve 184 is rigidly secured at its inner end to the frame 169 of the receiver 152. The sleeve 184 has formed on its outer end the gear-wheel 185, which is engaged by the segment 186, hereinafter described, the purpose of said segment 186, gear-wheel 185, and sleeve 184 (the latter being fastened to the frame 169 of said receiver) being to reverse said receiver or turn the same upside down during the descent of the receiver to deliver the filler-tobacco to the rolling mechanism and to return the said receiver to its upright position during the ascent of the latter to its upper normal initial position. (Shown in Fig. 16.) Upon the shaft 153 is provided within the outline of the frame 169 the gear-wheels 187, which are in engagement with vertical rack-bars 188, secured upon the ends of the carrier-frame 170, as indicated in Fig. 34 and by dotted lines in Fig. 35. Since the rack-bars 188 are secured to the carrier-frame 170, it will be obvious that upon the rotation of the shaft 153 the gear-wheels 187 will, operating through said rack-bars 188, move said carrier-frame 170 and plunger-frame 172 vertically, and this construction is provided so that the plunger 172 may be enabled to eject the filler-tobacco from the frame 176 of the receiver when the latter is in its lower position. The means for rotating the shaft 153, and thereby moving the plunger 172, comprise, primarily, the gear-wheel 189, secured upon the end of the said shaft 153, and the segment 190, in engagement with said gear-wheel.

It will be seen upon reference to Figs. 12, 16, 34, and 35 that at the left-hand end of the shaft 153, looking at the rear of the machine, (Fig. 12 being a rear view,) there are the two segments 183 186, having rearwardly-extended slotted arms 191 192, and that at the opposite end of the shaft 153 there is the segment 190, having the rearwardly-extended slotted arm 193. The means for operating the segments 183 186 is simply a stud 194, Figs. 12 and 36, which is secured to a rigid part of the framing of the machine and extends into the slots of the said arms 191 192, said slots forming cams and having their edges carried against the stud 194 during the vertical movement of the main frame, carrying the shaft 153 and receiver 152, said frame, as shown in Fig. 12, comprising the two side arms 155, the upper transverse bar 156, and the lower transverse bar 157. The slots of the arms 191 and 192 will be so shaped, as shown, that the arm 191 will by moving against the stud 194 be actuated to effect the opening and closing of the lids 178 of the receiver 152 and that the arm 192 may through the sleeve 184 effect the reversing movement of the receiver 152.

The segment 190 for operating the shaft 153 for moving the plunger 172 to discharge the filler-tobacco from the receiver 152 is actuated by a pivoted lever 195, Fig. 12, having at its lower end a stud 196 to play within a slot in the arm 193 of said segment 190 and oscillate said segment, and thereby rotate the shaft 153, Figs. 34 and 35, and gear-wheels 187 to act on the rack-bars 188 and move said plunger 172. The segment 190 and also the segments 183 and 186 are mounted on the rod 197 at the lower ends of the side bars 155 of the frame carrying the receiver 152.

The lever 195 for operating the segment 190 is given its rocking or oscillatory motion from the eccentric 198, (on the shaft 80, Figs. 5 and 6,) whose arm 199, Fig. 6, is pivotally secured to the upper end of said lever 195. The eccentric 198 is connected with and driven by the gear-wheel 200, Fig. 5, and the gear-wheel 200 is rotated by the gear-wheel 201, loose on the shaft 81, which gear-wheel 201 is fastened to the gear-wheel 202, which is also loose on the shaft 81 and is, with the gear-wheel 201, driven by the gear-wheel 203, which is loose on the shaft 80 and fastened to the locking-plate 204, Figs. 5 and 58, and gear-wheel 205, both of which are loose on said shaft 80. The gear-wheel 205 is rotated by the segmental series of teeth on the wheel 206, Figs. 66 and 67, which is fast on the shaft 81 and has the lateral concentric flange 207 to engage the locking-plate 204 and hold the gear-wheels 205 203 202 201 200 and eccentric 198 stationary until such time as said eccentric 198 should rotate and also after said eccentric has rotated and performed its duty of imparting the due movement to the aforesaid lever 195. The wheel 206 is shown in detail in Figs. 66 and 67 and, as will be seen, only has a few teeth; but the relation of the train of gears leading from the wheel 206 to the gear-wheel 200 is such that the latter and the eccentric 198 will perform at the proper time a full rotation. The locking-plate 204, connected with the gears 203 205, is shown in plan and edge elevation in Figs. 58 and 59, in which it will be seen that said plate has three curved locking-surfaces 208 to be engaged by the flange 207 of the wheel 206, wherefore the plate 204 and gear-wheels 203 and 205 will be permitted to make only one-third of a rotation with each full rotation of the wheel 206, and said one-third rotation will occur only when the teeth of the wheel 206 are moving against the teeth of the gear-wheel 205.

The rolling mechanism which receives the charges of filler-tobacco from the receiver 152 and rolls the same into the binders to form the bunches is more clearly shown in Figs. 4, 11, 22, 25, and 38 to 47, inclusive, and comprises a rolling-apron 209, Fig. 38, a rolling-bed 210, a recess or pocket 211, within which the usual loop in the apron 209 may be formed to receive the charge of filler-tobacco, a roller 212, to which the front end of the apron 209 is secured, a lower rear roller 213, to which the rear end of the apron 209 is secured, a pressure-blade 214 to follow the roller 212, and also, when desired, an endless belt 215, traveling in a reverse direction to that in which the bunch is moving while being rolled. The belt 215 is substantially coextensive in width with the apron 209 and is mounted upon the drum 216 and rollers 217 218, the latter being at the ends of the table 210, and in rear of said table 210 is provided a spring-clip 219, Figs. 22 and 38, to, as usual in this art, receive the finished bunch rolled rearwardly from over said table by the apron 209. The endless belt 215 receives its motion from the drum 216, and this drum is mounted on and receives its motion from the horizontal shaft 220, which by means of bevel-gears 221 221, Fig. 11, is driven from the vertical shaft 119, hereinbefore referred to. The roller 212 is carried on a shaft 222 at the rear end of a sliding frame comprising the two parallel side frames 223, Figs. 11, 38, and 39, which have rack-teeth 224 along their lower edges in engagement with the segmental gears 225 225, secured upon the transverse shaft 226, which at one end, Figs. 4 and 11, carries a gear-wheel 227, in engagement with a segmental-rack 228, mounted upon the end of the shaft 220 and connected by a rod 229 with the eccentric 230, Fig. 5, on the shaft 80, which eccentric through the rod 229 and segmental gear 228 effects the rotation of the gear-wheel 227, shaft 226, and segmental gears 225 for the purpose of imparting, through the rack-teeth 224, the proper sliding movement to the side frames 223, carrying the roller 212, said frames 223 moving rearwardly from the position shown in Fig. 38 to effect the rolling of the bunch and then traveling frontwardly to the position shown in Fig. 38, said frames 223 simply having a direct sliding motion for the purpose of carrying the roller 212 and pressure-blade 214. The eccentric 230 is connected on a sleeve with the gear-wheel 231, Fig. 5, which is driven by the gear-wheel 232 and has secured to its side the locking-plate 233, which is adapted to be engaged by the flange 234 on the gear-wheel 232, the latter being secured to the shaft 81. The gear-wheel 232 having the flange 234 and the gear-wheel 231 having the locking-plate 233 are clearly illustrated in Figs. 48, 54, 55, in which it will be seen that the gear-wheel 232 has teeth along only a portion of its edge and that the flange 234 of said gear-wheel 232 is adapted, after the teeth of said gear-wheel leave the teeth of the gear-wheel 231, to engage the curved end of the locking-plate 233 for the purpose of restraining the gear-wheel 231 against movement without necessitating a stoppage of the gear-wheel 232. When the flange 234 of the gear-wheel 232 is moving against the curved end of the locking-plate 233, the gear-wheel 231 and eccentric 230 will remain at rest; but after the said flange 234 leaves the end of said locking-plate 233 the gear-wheel 232 will rotate the gear-wheel 231 and effect the rotation of the eccentric 230 for the purpose of causing the frames 223, carrying the roller 212, to perform their movement. The purpose of the gearing shown in detail in Figs. 48, 54, 55 is to effect the proper movement of the eccentric 230 at the proper time with respect to the operation of the other features of the machine. The gear-wheel 232 is shown in plan and section in Figs. 48 and 49, respectively, and the gear-wheel 231 and locking-plate 233 are shown in plan and edge view, respectively, in Figs. 54 and 55. The side frames 223 may be guided by any suitable means from the framing of the machine, but in the present instance, as denoted in Figs. 11 and 40, said side frames are recessed, as at 235, to receive and be guided on the roller-studs 236, of usual character, said side frames 223 having the confining-strips 237 to act as guides and for confining said studs. The side frames 223 are connected together by the frame 238, Figs. 38, 43, 44, and 45, and intermediate this frame 238 and the roller 212 is mounted the pressure-blade 214, which is under a spring tension in an inward direction by reason of the spring 239, connected with its ends, Figs. 38 and 44. The blade 214 is provided with adjusting-screws 240 to engage stops 241 on the frame 238 for limiting the inward movement of said blade in a direction from the roller 212; but it is to be understood that the blade 214 is permitted to yield outwardly or toward the roller 212 under the tension of the springs 239 in accordance with the size of the bunch being rolled, there being a free space allowed between the roller 212 and frame 238 for the adjustment of said blade 214 and for permitting said blade to yield toward said roller during the operation of rolling a bunch, so that said blade may accommodate itself to the size of the bunch and then follow the gradual reducing diameter of the bunch during the rolling of the latter. The blade 214 cannot, however, recede from the roller 212 farther than it may be permitted to do by the screws 240 and stops 241, and hence the blade 214 will not be permitted to reduce the diameter of the bunch beyond a predetermined extent, regulatable by means of the screws 240. The blade 214 will be supported at the outer side of the frame 238 on studs 242, entering and guiding in apertures 243 of the frame 238. The frame 238, roller 212, blade 214, and springs 239 all travel with the frames 223, said springs at their inner ends being fastened to standards 244, Fig. 39, on said frames 223; but in addition the blade 214 is allowed the yielding action and adjustment above referred to. The operation of the blade 214 will be more fully referred to hereinafter. The roller 212 has a direct outward travel without rotating until the blade 214 passes over the loop in the apron 209 and beyond or to the outer side of the filler-tobacco in said loop at the pocket or recess 211, Fig. 38, and then said roller will perform a rapid rotation for a moment to wind the apron upon itself and draw down the loop of the apron around the filler-tobacco, and then said roller 212 while traveling toward the outer end of the rolling-bed 210 will perform a gradual rotation for the purpose of winding the apron upon itself and preserving the proper loop in the apron for the bunch. The means for effecting the aforesaid rotation of the roller 212 during its traveling movement comprise a slidable rack-bar 245, Figs. 11, 38, 41, and 42, gear-wheel 246, idler gear-wheels 247, Fig. 38, and gear-wheel 248 on the shaft 222 of the roller 212. The gear-wheel 246 has a locking-plate 249 fastened to it to engage a flat plate 250, carried at the inner end of the rack-bar 245, and when the roller 212 is at its inward position (shown in Fig. 38) the said plate 249 will rest on the said plate 250 and hold the gear-wheel 246 and gears 247 248 against rotation. The plate 250 will be of such length that the plate 249 will not leave it during the outward travel of the roller 212 until the blade 214 has passed outward beyond the filler-tobacco in the loop of the apron at the pocket or recess 211, and hence during this outward travel of the roller 212 the latter will be held against rotation, but by traveling outward will fold the apron over the filler-tobacco and form a loop, within which the bunch will be rolled. The roller 212 having thus traveled outward to a limited extent and the locking-plate 249 having reached the end of the plate 250, the said roller will be given its momentary rapid rotation, so that it may wind the apron and draw the loop therein down to proper size, and this action will then be performed by giving the rack-bar 245 a limited inward thrust, so that its upper teeth 251 may move against the teeth of the gear-wheel 246 and rotate the same and (through the gears 247 and 248) also the roller 212. This inward thrust is given to the rack-bar 245 by the movement of a segment 252, Fig. 38, against the short series of teeth 253 on the lower edge of said bar, and the bar 245 is guided and prevented from having any undue inward movement by means of the slots 254 in said bar and the stationary studs 255 in said slots. After the rack-bar 245 has performed its inward thrust to effect the momentary rapid rotation of the roller 212 it will remain in its then inward position during the outward travel of the roller 212, and during this outward travel of the roller 212, said rack-bar 245 being held stationary, the gear-wheel 246 will be carried against the teeth 251 of said rack-bar and be rotated thereby, with the result that the roller 212 will be given a gradual rotation during its outward travel. The segment 252 is loose on the shaft 220, and it is shown by dotted lines in Fig. 38 and by full lines in side elevation and edge view, respectively, in Figs. 60 and 61, and said segment 252 is fastened to a sleeve 256, Fig. 11, free on said shaft 220 and having a crank-arm 257, pivotally connected with the lower end of a rod 258, which is driven by an eccentric 259, connected with a sleeve 260, Fig. 5, free on the shaft 80. The eccentric 259 and rod 258 are actuated in proper time and held stationary when they should not move by a train of gears on the shafts 80 81, Fig. 5, and comprising the driving-gear 261, fixed on the shaft 81, the gear-wheel 262, free on the shaft 80 and having a locking-plate 263 to be engaged by the flange 264 of the wheel 261, the gear-wheel 265, fastened to the gear-wheel 262, the gear-wheel 266, loose on the shaft 81, the gear-wheel 267, which is fastened to the gear-wheel 266, and the gear-wheel 268, which is fast on the sleeve 260 and is driven by the wheel 267 and drives said sleeve and the eccentric 259 for the purpose at the proper time of moving the vertical rod 258 to actuate the segment 252 and rack-bar 245, and thereby effecting a limited rapid rotation of the apron-roller 212. When the teeth of the gear-wheel 261 are moving against the teeth of the gear-wheel 262, the eccentric 259 will be actuated, and when the flange 264 of the wheel 261 is moving against the locking-plate 263 the train of gears and eccentric 259 will be held stationary. The gear-wheels 261 and 262, with the locking-plate 263, are shown in detail in Figs. 8 and 26. The gear-wheel 246 and locking-plate 249 for coöperation with the rack-bar 245 are shown in detail in Figs. 52 and 53. The roller 212 will after the rolling of the bunch return to its inward position, (shown in Fig. 38,) and while said roller is traveling inward it will be reversely rotated by reason of the movement of the gear-wheel 246 over the teeth 253 of the rack-bar 245, this reverse rotation resulting in the unwinding of the apron 209 from said roller and continuing at a gradual uniform rate until the roller nearly reaches the recess or pocket 211, when the segment 252 will thrust the rack-bar 245 outwardly to compel a momentary rapid unwinding of all the necessary part of the apron from the roller 212 and to bring the plate 250 of said bar into position to engage the locking-plate 249 of the gear-wheel 246, by reason of which the roller during its then continued movement inward to its position shown in Fig. 38 will drop the apron 209 loosely over the pocket or recess 211 and perform no rotation.

The means for lengthening and shortening the rolling-apron 209 are more clearly illustrated in Figs. 22, 23, 24, and 38, in which it will be seen that the lower roller 213, to which one end of the apron 209 is connected, is secured upon the shaft 270, which has at one end a toothed wheel 271, Figs. 22 and 23, and at its other end, as shown in Fig. 22, is of square form to receive an ordinary key for turning said shaft and said roller 213 for the purpose of winding the apron 209 on said roller or unwinding said apron from said roller. The roller 213 may of course be turned by hand or otherwise, as may be preferred, and after being turned said roller 213 should be locked in position, and the means I provide for locking the roller 213 comprise the aforesaid toothed wheel 271 and a locking-plate 272, (shown in detail in Fig. 24,) which is mounted to slide upon a shaft 273 and is toothed at one end, as at 274, to engage the toothed wheel 271, and thereby prevent said wheel 271 from turning. The locking-plate 272 is loose upon the shaft 273, and a coiled spring 275 normally presses the plate 272 inward to its position for engaging the aforesaid wheel 271. When it is desired to adjust the apron 209 from the roller 213, the operator will move the locking-plate 272 outward on the shaft 273 and then turn the roller 213, and after the roller 213 has been turned sufficiently to secure the proper length in the apron 209 the locking-plate 272 will be moved back to the position in which it is shown in Fig. 23, its toothed end 274 then engaging the toothed wheel 271 and locking the roller 213 against rotation.

The endless traveling belt 215 should be provided with a suitable belt-tightener to take up any slack which may arise in said belt, and to this end I provide at the opposite sides of the rear end of the machine the segments 276, (shown in Figs. 4 and 22,) connected at their upper edges by a shaft or bar 277, which may be moved upward against the said belt 215, as will be clearly understood upon reference to Fig. 22. When the segments 276 are moved upward, their shaft or bar 277 will be pressed against the belt 215 and result in tightening the latter in a well-understood manner. As convenient means for moving the segments 277 I provide pinion-wheels 278, Fig. 22, upon the ends of the shaft 273 for engaging the segments 276. The outer end of the shaft 273 is squared to receive a key by which the shaft may be turned, and upon turning the shaft 273 the pinion-wheels 278 at its ends will engage and move the segments 276. The segments 276 may be locked in any set position by means of a ratchet-plate 280, Fig. 22, on the end of the shaft 273 and a coöperating dog 281, pivoted to the side of the machine and engaging said ratchet-plate 280.

The means for adjusting the length of the apron 209 and the means for tightening the belt 215 are simply convenient means for the purposes indicated and may be modified at will.

The operation of the various features of the machine above described has been largely pointed out in connection with the explanation of the construction of said features, and hence only a brief further description of the operation seems necessary. The filler-tobacco will be fed to the various pockets or molds 98 of the rotary table 79, and said molds 98 will one after another in succession be brought below the series of plungers 105, by which the filler-tobacco will be pressed downward into the receiver 152, the said receiver assuming its upright position below the mold in line with the plungers 105 and the knife-blade 111 for said mold withdrawing, so as to fully open the passage for the filler-tobacco. The filler-tobacco will be pressed into the receiver 152, shaped to the plungers 105, and any surplus tobacco will be severed by the knife-blade 111 upon the ascent of the plungers 105, such surplus remaining in the mold 98. With the delivery of each charge of filler-tobacco to the receiver 152 the latter will descend and give the same to the rolling apron 209, the lids 178 of the receiver 152 first closing and then said receiver descending and turning upside down, so that its normal upper end may lie close to the apron 209, and above the loop therein at the pocket or recess 211, Fig. 38, the lids 178 of the receiver then opening, and the plunger 172 of said receiver then descending to eject the charge of filler-tobacco and cause its deposit upon the apron 209. The receiver 152 after thus delivering the charge of filler-tobacco to the apron 209 will ascend and be restored to its upright position below a mold 98 of the rotary table 79 preparatory to receiving another charge of filler-tobacco. An operator sitting at the rear or delivery end of the machine will place the proper binders upon the rolling-apron 209 in the usual manner for cigar-bunching machines, and the charge of filler-tobacco and the binder now being on the apron 209 the roller 212 will start outward, as hereinbefore described, and lay the apron over the said charge of filler-tobacco, the said roller 212 having a direct outward movement, without rotating until the pressure-blade 214 passes outward over the loop in the apron and over the charge of filler-tobacco in said loop, whereupon the roller 212 and blade 214 will continue on their outward travel; but the roller 212 will first have a rapid rotation to wind the apron 209 upon itself and draw the loop closely around the filler-tobacco and against the inner edge of the blade 214. Thereafter the roller 212 and blade 214 will continue on their outward travel, the roller 212 having a gradual uniform rotation, keeping the loop of the apron close against the inner edge of the blade 214, whereby the pressure is created for normally and properly rolling the bunch. The roller 212 and blade 214 will continue on their outward line of travel until the finished bunch has been rolled into the spring clip or receiver 219, and thereupon the roller 212 and blade 214 will return to their inward position, (shown in Fig. 38,) said roller 212 during such inward travel unwinding and releasing the spring 209 in the manner which has been fully pointed out hereinbefore. The blade 214 is adjustable for different sizes of bunches by means of the screws 240 and is automatically adaptable to variations in the initial size of the bunches by reason of the springs 239 and the clearance permitted between said blade and the inner edge of the roller 212. For illustration, if by reason of the looseness of the filler-tobacco or other cause the initial size of the charge in the loop of the apron should be larger than normal the blade 214 could yield outwardly to a sufficient extent to properly engage, through the apron 209, the said charge and gradually during the rolling operation reduce the same to its proper size and consistency. The extreme inward position that the blade 214 should have may be regulated at will by means of the screws 240, and by means of said screws the initial position of the blade 214 may be at any time regulated in accordance with the nature of the bunches to be produced. The blade 214 will be adjusted outward toward the roller 212 when larger bunches are to be made and inward toward the frame 238 when smaller bunches are to be made, and the said blade 214 cannot reduce the diameter of the bunches greater than is permitted by its adjustment by means of the screws 240. The plungers 105 may be so adjusted to exert just the desired amount of pressure upon the filler-tobacco carried below them in the molds 98, since the springs 139 for said plungers are independently adjustable along the pivoted lever-arms 142, and hence the operator, with a due regard for the character of the bunch to be produced, may regulate the pressure that the said plungers 105 in their entirety or separately considered shall exert. The endless belt 215 by traveling in a direction oppositely to and in contact with the apron 209 carries all slack that may exist in the main body of said apron in a direction toward the loop thereof, from which point it is taken up by the roller 212.

What I claim as my invention, and desire to secure by Letters Patent, is—

1. In a cigar-bunching machine, the rotary feed-table having the series of pockets or molds for receiving the filler-tobacco, means for imparting an intermittent rotary motion to said table, and means for locking said table at the end of each of its movements, combined with the sectional plunger adapted to the pockets or molds of said table for pressing the filler-tobacco through the same, means for operating said sectional plunger, rolling mechanism, and means for conveying the filler-tobacco pressed through said molds to said rolling mechanism; substantially as set forth.

2. In a cigar-bunching machine, the rotary feed-table having the series of pockets or molds for receiving the filler-tobacco, means for imparting an intermittent rotary motion to said table, and means for locking said table at the end of each of its movements, combined with the sectional plunger adapted to the pockets or molds of said table for pressing the filler-tobacco through the same, the series of knife-blades carried below said table for severing the surplus filler-tobacco in said molds from that portion thereof intended for the bunches, means for maintaining said knife-blades below said molds to close the latter at their lower end except when one of said molds is below said plunger, means for operating said knife-blades when below said plunger for first withdrawing the knife-blade from below the mold and then driving it outward to its former position to enable said knife-blade to sever the filler-tobacco and again close the lower end of the mold, means for operating said sectional plunger, and rolling mechanism to receive the filler-tobacco pressed through said molds and below said blades, the surplus tobacco remaining within said molds above said blades; substantially as set forth.

3. In a cigar-bunching machine, the rotary feed-table having the series of pockets or molds for receiving the filler-tobacco, means for imparting an intermittent rotary motion to said table, and means for locking said table at the end of each of its movements, combined with the plunger adapted to the pockets or molds of said table for pressing the filler-tobacco through the same, the series of knife-blades carried below said table, means for maintaining said knife-blades below said pockets or molds for closing the lower end of the latter except when a mold and its knife-blade are below said plunger, means for withdrawing the knife-blade when below said plunger from below its pocket or mold and then driving said knife-blade outward to sever the filler-tobacco and again close the lower end of the mold, means for operating said plunger, and rolling mechanism to receive the filler-tobacco pressed through said molds and below said blades, the surplus tobacco remaining within said molds above said blades; substantially as set forth.

4. In a cigar-bunching machine, the rotary feed-table having the series of pockets or molds for receiving the filler-tobacco, and means for imparting an intermittent rotary motion to said table, combined with the plunger adapted to the pockets or molds of said table for pressing the filler-tobacco through the same, the series of knife-blades carried below said table and normally closing the lower ends of said pockets or molds, the series of rollers connected with said knife-blades, a knife-cam 106 having a groove receiving the said rollers and also having the oppositely-inclined surfaces 113 and 114 for acting on said knives in succession as they pass into position below said plunger, whereby to withdraw said knife-blades in succession and then drive the same outward through the filler-tobacco pressed downward by said plunger, means for compelling said knife-cam to rotate with said table for a predetermined distance and then perform a reverse motion for carrying said surfaces 113 and 114 against the roller of the knife-blade then below said plunger, means for operating said plunger, and rolling mechanism, to receive the filler-tobacco pressed through said molds and below said blades, the surplus tobacco remaining within said molds above said blades; substantially as set forth.

5. In a cigar-bunching machine, the rotary feed-table having the series of pockets or molds for receiving the filler-tobacco, and means for imparting an intermittent rotary motion to said table, combined with the plunger adapted to the pockets or molds of said table for pressing the filler-tobacco through the same, the series of knife-blades carried below said table and normally closing the lower ends of said pockets or molds, the series of rollers connected with said knife-blades, the knife-cam 106 having a groove receiving the said rollers and also having the oppositely-inclined surfaces 113 and 114 for acting on said knives in succession as they pass into position below said plunger, whereby to withdraw said knife-blades in succession and then drive the same outward through the filler-tobacco pressed downward by said plunger, means for compelling said cam to rotate with said table for a predetermined distance and then to perform a reverse rotation in two divisions to its former position whereby said cam during the first part of its reverse motion will bring one of said inclined surfaces against the roller of the knife-blade below the plunger and then, after a stoppage, carry the other inclined surface against said roller while performing the second division of its reverse rotation, means for operating said plunger, and rolling mechanism, to receive the filler-tobacco pressed through said molds and below said blades, the surplus tobacco remaining within said molds above said blades; substantially as set forth.

6. In a cigar-bunching machine, the rotary feed-table having the series of pockets or molds for receiving the filler-tobacco, the plate 101 secured to said table and having the series of radial slots 104 corresponding in number with said molds, the crank-arm 126 having the roller 127 adapted to enter said slots and effect the intermittent rotation of said plate and said feed-table, and means for turning said crank-arm 126 to perform a complete rotation, whereby upon said roller 127 emerging from one of said slots, it may be enabled to rotate to another one thereof, said plate and said table remaining in stationary position during the travel of said roller 127 from one slot to another of said plate, combined with the plunger adapted to the pockets or molds of said table for pressing the filler-tobacco through the same, means for operating said plunger, and rolling mechanism; substantially as set forth.

7. In a cigar-bunching machine, the rotary feed-table having the series of pockets or molds for receiving the filler-tobacco, the plate 101 connected with said table and having the series of radial slots 104 corresponding in number with the said pockets or molds and also having intermediate said slots the recesses 129, crank-arm 126 having the roller 127 adapted to enter and travel within the aforesaid slots, means for turning said crank-arm 126 to compel said roller to enter said slots and impart an intermittent motion to said plate and said table, and the flange 128 connected with said crank-arm for moving in and engaging said recesses during the period that said roller 127 is free of said plate whereby to lock said plate and said table at the end of each of their intermittent motions, combined with the plunger for pressing the filler-tobacco through the said pockets or molds, means for operating said plunger, and rolling mechanism; substantially as set forth.

8. In a cigar-bunching machine, the rotary feed-table having the series of pockets or molds for receiving the filler-tobacco, and means for imparting an intermittent rotary motion to said table, combined with the series of plungers 105 constituting a sectional plunger adapted to the said pockets or molds, the independent rods 131 carrying said plungers, the vertically-movable frame supporting and adapted to guide said rods, the blocks 138 on said rods and engaging a portion of said frame for normally maintaining said plungers in their initial position, the pivoted levers 142 at one end engaging said blocks and at their other end having the recessed edges, the series of springs 139 fastened at their upper end to said frame and at their lower end carrying the stirrups 141 in engagement with the recessed end of said levers for yieldingly pressing the said plungers downward, and rolling mechanism, the said stirrups being adjustable along said levers for independently regulating the tension of said springs; substantially as set forth.

9. In a cigar-bunching machine, a feed-table having a mold or pocket to receive the filler-tobacco, a knife-blade below and normally closing said pocket at its lower end, the series of plungers 105 forming a sectional plunger adapted to said mold or pocket, the independent rods 131 carrying said plungers, the vertically-movable frame supporting and guiding said rods, the blocks 138 on said rods and engaging a portion of said frame, the pivoted levers 142 at one end engaging said blocks, the series of springs 139 engaging the other end of said levers for causing the latter to exert downward pressure against said blocks, and means for moving said frame and plungers in a vertical direction, combined with means for actuating said knife-blade to sever the surplus filler-tobacco placed in said mold or pocket, rolling mechanism, and means for conveying the filler-tobacco pressed through said mold or pocket by said plungers to said rolling mechanism; substantially as set forth.

10. In a cigar-bunching machine, a feed-table having a mold or pocket to receive the filler-tobacco, a knife-blade below and normally closing said pocket at its lower end, the series of plungers 105 forming a sectional plunger adapted to said mold or pocket, the independent rods 131 carrying said plungers, the vertically-movable frame supporting and guiding said rods, the blocks 138 on said rods and engaging a portion of said frame, the pivoted levers 142 at one end engaging said blocks, the series of springs 139 engaging the other end of said levers for causing the latter to exert downward pressure against said blocks, means for independently adjusting the tension of said springs for independently regulating the pressure to be exerted by said plungers, means for moving said frame carrying said plungers in a vertical direction, combined with means for actuating said knife-blade to sever the surplus filler-tobacco placed in said mold or pocket, rolling mechanism, and means for conveying the filler-tobacco pressed through said mold or pocket by said plungers to said rolling mechanism; substantially as set forth.

11. In a cigar-bunching machine, a feed-table having a pocket or mold to receive the filler-tobacco, a plunger for pressing the filler-tobacco through said mold, rolling mechanism for rolling the bunch, and a receiver for receiving the charge of filler-tobacco pressed through said mold and conveying the same to the said rolling mechanism, said receiver comprising the frame 169, a plunger 172 forming the bottom of the cavity in the said receiver, and hinged lids 178 for closing over the upper end of said receiver after the filler-tobacco is therein, combined with the shaft 153 upon which said receiver is mounted, a vertically-movable frame carrying said shaft 153, the racks 188 connected with said plunger 172, the gear-wheels 187 on said shaft for engaging said racks and moving said plunger, means for rotating said shaft to turn said wheels 187, the sleeve 184 on said shaft and connected at one end to said receiver and at the other end having a gear-wheel 185, means for engaging said gear-wheel 185 for turning the same and reversing the said receiver, the sleeve 181 on said sleeve 184 and having at its ends the gear-wheels 180, 182, respectively, gears connected with said lids and in engagement with said gear-wheel 180 to be operated by the latter for opening and closing said lids, and means connected with said gear-wheel 182 for turning the same and effecting thereby the rotation of said gear-wheel 180 and the opening and closing of said lids; substantially as set forth.

12. In a cigar-bunching machine, the feed-table having a pocket or mold approximately in the outline of a cigar to receive the filler-tobacco, a plunger approximately in the outline of a cigar for pressing the filler-tobacco through said mold, rolling mechanism for rolling the bunch, and a receiver having a cavity approximately in the outline of a cigar for receiving the charge of filler-tobacco pressed through said mold and conveying the same to the said rolling mechanism, said receiver comprising the exterior casing or frame 169, the plunger 172 forming the bottom of the cavity in said receiver and being approximately in the outline of a cigar, and the lids for closing over the upper end of said receiver after the filler-tobacco is therein, combined with the vertically-movable frame carrying said receiver, means for moving said frame, means for opening and closing said lids, means for reversing said receiver during its vertical movement, and means for actuating the plunger within said receiver; substantially as set forth.

13. The rotary feed-table having the pockets or molds for receiving the filler-tobacco, means for imparting an intermittent rotary motion to said table, a plunger adapted to the said pockets or molds for pressing the filler-tobacco through the same, rolling mechanism, and means for conveying the filler-tobacco pressed through said molds to said rolling mechanism, said rolling mechanism comprising the flexible apron 209, a rolling-table upon which said apron is arranged, the roller 212 to which one end of said apron is connected, and a pressure-blade 214 mounted to travel with and follow said roller and to engage the loop to be formed in said apron, combined with a slidable frame carrying said roller and blade, means for moving said frame, means for preventing the rotation of said roller 212 until after said blade has passed over the loop to be formed in said apron around the filler-tobacco, means for then giving said roller a rapid rotation for winding up said apron and drawing said loop down to size against the edge of said blade, and means for then imparting a substantially uniform and less rapid rotation to said roller 212 during its continued outward travel for gradually winding up said apron; substantially as set forth.

14. The rotary feed-table having the pockets or molds for receiving the filler-tobacco, means for imparting an intermittent rotary motion to said table, a plunger adapted to said pockets or molds for pressing the filler-tobacco through the same, rolling mechanism, and means for conveying the filler-tobacco pressed through said molds to said rolling mechanism, said rolling mechanism comprising the flexible apron 209, a rolling-table upon which said apron is arranged, the roller 212 to which one end of said apron is connected, the pressure-blade 214 mounted to travel with and follow said roller and to engage the loop to be formed in said apron, and a spring exerting its force against said blade in a direction opposed to the direction of travel of said blade during the rolling of a bunch, combined with a slidable frame carrying said roller and blade, means for moving said frame and means for taking up the slack in said apron; substantially as set forth.

15. The rotary feed-table having the pockets or molds for receiving the filler-tobacco, means for imparting an intermittent rotary motion to said table, a plunger adapted to the said pockets or molds for pressing the filler-tobacco through the same, rolling mechanism, and means for conveying the filler-tobacco pressed through said molds to said rolling mechanism, said rolling mechanism comprising the flexible apron 209, a rolling-table upon which said apron is arranged, the roller 212 to which one end of said apron is connected, and a pressure-blade 214 mounted to travel with and follow said roller and to engage the loop to be formed in said apron, combined with a slidable frame carrying said roller and blade, means for moving said frame, the gear-wheel 248 connected with said roller, the gear-wheel 246 indirectly geared to said wheel 248 and having the locking-plate 249, the rack-bar 245 having the upper teeth 251 to engage said gear-wheel 246 and also the flat plate 250 to engage said locking-plate 249 and also the lower gear-teeth 253, the segment 252 for engaging said teeth 253 of said rack-bar, and means for actuating said segment to shift said rack-bar for causing said roller to wind up said apron and draw the loop therein down to size against said pressure-blade, said locking-plate 249 during the first portion of the outward travel of the roller 212 being in engagement with the said plate 250 and preventing the rotation of said roller, and thereafter leaving said flat plate 250 and enabling the teeth 251 of said rack-bar to engage said gear-wheel 246, the latter being then permitted to rotate and to effect the rotation of said roller 212; substantially as set forth.

16. The rotary feed-table having the pockets or molds for receiving the filler-tobacco, means for imparting an intermittent rotary motion to said table, a plunger adapted to said pockets or molds for pressing the filler-tobacco through the same, rolling mechanism, and means for conveying the filler-tobacco pressed through said molds to said rolling mechanism, said rolling mechanism comprising the flexible apron 209, a rolling-table upon which said apron is arranged, the roller 212 to which one end of said apron is connected, the pressure-blade 214 mounted to travel with and follow said roller and to engage the loop to be formed in said apron, and means for exerting a yielding force against said blade in a direction opposed to the direction of travel of said blade during the rolling of a bunch, combined with a slidable frame carrying said roller and blade, means for moving said frame, and means for taking up the slack in said apron; substantially as set forth.

17. In a cigar-bunching machine, a feed-table having a pocket or mold to receive the filler-tobacco, a plunger for pressing the filler-tobacco through said mold, rolling mechanism, and means for conveying the filler-tobacco pressed through said mold to said rolling mechanism, said rolling mechanism comprising the flexible apron 209, a rolling-table upon which said apron is arranged, the roller 212 to which one end of said apron is connected, the pressure-blade 214 mounted to travel with said roller and to engage the loop to be formed in said apron, and means for exerting a yielding force against said blade in a direction opposed to the direction of travel of said blade during the rolling of a bunch, combined with a slidable frame carrying said roller and blade, means for moving said frame, the adjusting-screws and stops for regulating the initial position of said blade with respect to said roller, and means for taking up the slack in said apron; substantially as set forth.

18. In a cigar-bunching machine, a feed-table having a pocket or mold to receive the filler-tobacco, a plunger for pressing the filler-tobacco through said mold, rolling mechanism, and means for conveying the filler-tobacco pressed through said mold to said rolling mechanism, said rolling mechanism comprising the flexible apron 209, a rolling-table upon which said apron is arranged, the roller 212 to which one end of said apron is connected, the pressure-blade 214 mounted to travel with said roller and to engage the loop to be formed in said apron, and means for exerting a yielding force against said blade in a direction opposed to the direction of travel of said blade during the rolling of a bunch, combined with the slidable frame comprising the sides 223 carrying said roller, the transverse frame 238 connecting said sides, the studs secured to said blade and guided in apertures in said frame 238, adjusting means for regulating the initial position of said blade with respect to said roller, and means for moving the said frame carrying said roller and blade; substantially as set forth.

19. In a cigar-bunching machine, a feed-table having a pocket or mold to receive the filler-tobacco, a plunger for pressing the filler-tobacco through said mold, rolling mechanism, and means for conveying the filler-tobacco pressed through said mold to said rolling mechanism, said rolling mechanism comprising the flexible apron 209, a rolling-table upon which said apron is arranged, the roller 212 to which one end of said apron is connected, the pressure-blade 214 mounted to travel with said roller and to engage the loop to be formed in said apron, and means for exerting a yielding force against said blade in a direction opposed to the direction of travel of said blade during the rolling of a bunch, combined with the slidable frame carrying said roller and comprising the sides 223 having the toothed lower edges, the transverse frame 238 connecting said sides, the studs connected with said blade and guided in said frame 238, adjusting means for regulating the initial position of said blade with respect to said roller, means for taking up the slack in said apron, and driving-gear engaging the lower toothed edges of said sides for moving the same and the parts carried thereby; substantially as set forth.

20. In a cigar-bunching machine, a feed-table having a pocket or mold to receive the filler-tobacco, a plunger for pressing the filler-tobacco through said mold, rolling mechanism, and means for conveying the filler-tobacco pressed through said mold to said rolling mechanism, said rolling mechanism comprising the flexible apron 209, a rolling-table upon which said apron is arranged, the roller 212 to which one end of said apron is connected, the pressure-blade 214 mounted to travel with said roller and to engage the loop to be formed in said apron, the belt 215 below said apron, and means for moving said belt in a direction reversely to that taken by said apron during the rolling of a bunch, combined with a slidable frame carrying said roller and blade, means for moving said frame, and means for taking up the slack in said apron; substantially as set forth.

Signed at New York, in the county of New York and State of New York, this 10th day of June, A. D. 1902.

JOHN R. WILLIAMS.

Witnesses:
 CHAS. C. GILL,
 ARTHUR MARION.